US012592843B2

(12) United States Patent
Asano et al.

(10) Patent No.: US 12,592,843 B2
(45) Date of Patent: Mar. 31, 2026

(54) INFORMATION PROCESSING DEVICE AND INFORMATION PROCESSING METHOD

(71) Applicant: SONY GROUP CORPORATION, Tokyo (JP)

(72) Inventors: Yasuharu Asano, Tokyo (JP); Keiichi Yamada, Tokyo (JP); Yoshinori Maeda, Tokyo (JP); Akira Inoue, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 192 days.

(21) Appl. No.: 18/551,621

(22) PCT Filed: Feb. 16, 2022

(86) PCT No.: PCT/JP2022/006165
§ 371 (c)(1),
(2) Date: Sep. 21, 2023

(87) PCT Pub. No.: WO2022/215361
PCT Pub. Date: Oct. 13, 2022

(65) Prior Publication Data
US 2024/0171418 A1      May 23, 2024

(30) Foreign Application Priority Data

Apr. 6, 2021      (JP) ................................. 2021-064955

(51) Int. Cl.
*H04L 12/18*          (2006.01)
*G06F 40/35*          (2020.01)
(52) U.S. Cl.
CPC ...... *H04L 12/1818* (2013.01); *H04L 12/1831* (2013.01); *G06F 40/35* (2020.01)

(58) Field of Classification Search
None
See application file for complete search history.

(56) References Cited

U.S. PATENT DOCUMENTS 10,469,275  B1    11/2019  Broomall et al.
2006/0164508  A1*    7/2006  Eshkoli .................. H04N 7/152
348/14.09

(Continued)

FOREIGN PATENT DOCUMENTS

JP          2013161328  A        8/2013
JP          2014-137706  A        7/2014
WO      WO-2016158267  A1      10/2016

OTHER PUBLICATIONS

International Search Report and Written Opinion of PCT Application No. PCT/JP2022/006165, issued on May 10, 2022, 08 pages of ISRWO.

(Continued)

*Primary Examiner* — Hemant S Patel
(74) *Attorney, Agent, or Firm* — CHIP LAW GROUP

(57) ABSTRACT

An information processing device according to the present disclosure includes an estimation unit that, when a plurality of participants participating in a remote meeting are divided into a plurality of groups and can have conversation in the groups, estimates a topic of conversation in a group from speech of a participant belonging to the group and a notification unit that, when the topic of a second group that is a group other than a first group that is a group to which one participant belongs and preference of the one participant satisfy a condition concerning similarity, notifies the one participant of the second group.

17 Claims, 12 Drawing Sheets

(56) References Cited

U.S. PATENT DOCUMENTS

| | | | |
|---|---|---|---|
| 2009/0225971 A1 | 9/2009 | Miller | |
| 2013/0290434 A1 | 10/2013 | Bank | |
| 2014/0267550 A1* | 9/2014 | Nimri | H04N 7/152 |
| | | | 348/14.09 |
| 2018/0048751 A1* | 2/2018 | Crowell | H04M 1/656 |
| 2018/0322122 A1 | 11/2018 | Miao et al. | |
| 2019/0051301 A1 | 2/2019 | Locascio | |
| 2020/0234696 A1* | 7/2020 | Vashisht | G10L 15/24 |
| 2022/0264055 A1* | 8/2022 | Foessel | H04N 23/69 |

OTHER PUBLICATIONS

"Use breakout rooms in Teams meetings" Microsoft Corporation, Apr. 1, 2021, 12 pages.

* cited by examiner

122

| GROUP ID | TOPIC | PARTICIPANT | STATE | ... |
|---|---|---|---|---|
| GP1 | GT1 | U1 | ONLOOKER | ... |
| | | U2 | PERSON CONCERNED | ... |
| | | U3 | ONLOOKER | ... |
| | | U4 | PERSON CONCERNED | ... |
| | | ... | ... | ... |
| GP2 | ... | ... | ... | ... |
| ... | ... | ... | ... | ... |

FIG.13

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2022/006165 filed on Feb. 16, 2022, which claims priority benefit of Japanese Patent Application No. JP 2021-064955 filed in the Japan Patent Office on Apr. 6, 2021. Each of the above-referenced applications is hereby incorporated herein by reference in its entirety.

FIELD

The present disclosure relates to an information processing device and an information processing method.

BACKGROUND

In recent years, a meeting by a plurality of users such as a web conference has been remotely performed by communicating voices and images through the Internet (also referred to as "remote meeting"). A technology for dividing users (also referred to as "participants") participating in such a remote meeting into a plurality of groups has been known (for example, Non Patent Literature 1).

CITATION LIST

Non Patent Literature

Non Patent Literature 1: "Use breakout rooms in Teams meetings", Microsoft Corporation <Internet> https://web.archive.org/web/20210122112205/https://support.microsoft.com/en-us/office/use-breakout-rooms-in-teams-meetings-7de1f48a-da07-466c-a5ab-4ebace28e461 (Searched on Apr. 1, 2021)

SUMMARY

Technical Problem

However, in the related art, it is not always possible to notify participants participating in the remote meeting of appropriate information. In the related art, after the division into the groups, it is difficult for each the users to recognize a situation outside the group to which the users belong. Therefore, it has been desired to notify the participants participating in the remote meeting of appropriate information.

Therefore, the present disclosure proposes an information processing device and an information processing method that can notify participants participating in a remote meeting of appropriate information.

Solution to Problem

According to the present disclosure, an information processing device includes an estimation unit that, when a plurality of participants participating in a remote meeting are divided into a plurality of groups and can have conversation in the groups, estimates a topic of conversation in a group from speech of a participant belonging to the group, and a notification unit that, when the topic of a second group that is a group other than a first group that is a group to which one participant belongs and preference of the one participant satisfy a condition concerning similarity, notifies the one participant of the second group.

BRIEF DESCRIPTION OF DRAWINGS

FIG. 13 is a diagram illustrating an example of a display mode.

DESCRIPTION OF EMBODIMENTS

Figure 1:
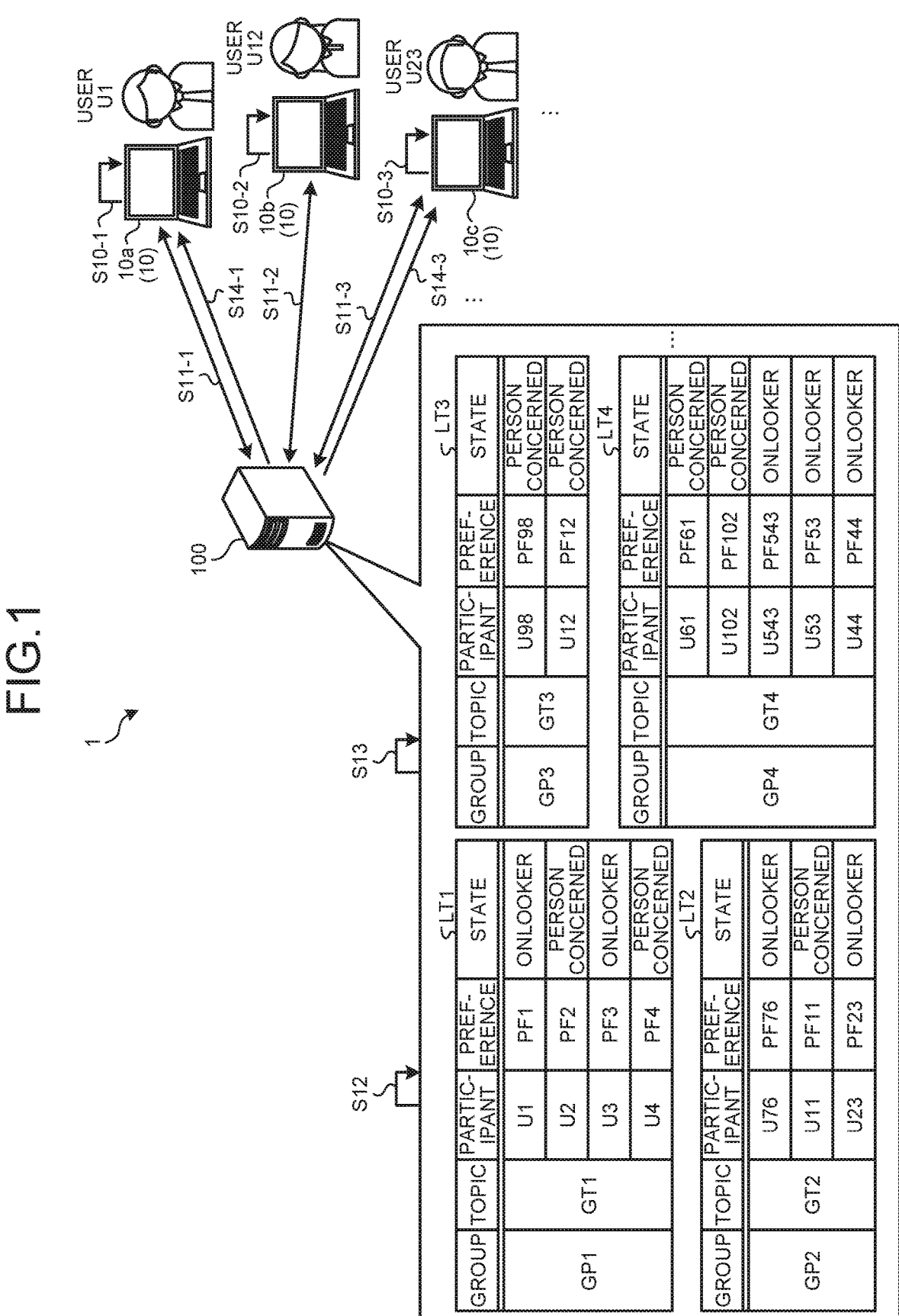
FIG. 1 is a diagram illustrating an example of information processing according to an embodiment of the present disclosure.

Embodiments of the present disclosure are explained in detail below with reference to the drawings. Note that an information processing device and an information processing method according to the present application are not limited by the embodiments. In the embodiments explained below, the same parts are denoted by the same reference numerals and signs to omit redundant explanation.

The present disclosure is explained according to order of items described below.

1. Embodiment
1-1. Overview of information processing according to embodiment of present disclosure
1-1-1. Display example of presence of notification of recommended group
1-1-2. Display example of absence of notification of recommended group
1-1-3. Background, effects, and the like
1-1-4. Participation state of user
1-1-5. Group to be presented
1-1-6. Notification mode
1-1-7. Group movement, and the like 1-2. Configuration of remote meeting system according to embodiment 1-3. Configuration of information processing device according to embodiment 1-4. Configuration of terminal device according to embodiment 1-5. Procedure of information processing according to embodiment 1-5-1. Procedure of processing relating to information processing device 1-5-2. Procedure of processing relating to terminal device 1-5-3. Procedure of processing relating to remote meeting server 1-5-4. Procedure of matching processing 1-6. Output mode example (party venue)

2. Other embodiments 2-1. Other configuration examples 2-2. Others

3. Effects according to present disclosure

4. Hardware configuration

1. Embodiment

1-1. Overview of Information Processing According to Embodiment of Present Disclosure FIG. 1 is a diagram illustrating an example of information processing according to an embodiment of the present disclosure. The information processing according to the embodiment of the present disclosure is implemented by a remote meeting system 1 including a remote meeting server 100 and a plurality of terminal devices 10. In FIG. 1, in order to distinguish and explain terminal devices 10, the terminal devices 10 are sometimes as a terminal device 10a, a terminal device 10b, and a terminal device 10c. Note that, when the terminal device 10a, the terminal device 10b, the terminal device 10c, and the like are explained without being particularly distinguished, the terminal device 10a, the terminal device 10b, the terminal device 10c are described as "terminal device 10". Although three terminal devices 10 are illustrated in FIG. 1, there may be four or more terminal devices 10.

First, an overview of a service, definitions of terms, and the like concerning a remote meeting provided by the remote meeting system 1 are explained with reference to FIG. 1. Note that detailed explanation of the same points as those of a remote meeting service such as a general web conference is omitted as appropriate. The remote meeting system 1 has a function of dividing users (participants) participating in a remote meeting (hereinafter also referred to as "meeting") into a plurality of groups. FIG. 1 illustrates a case in which a plurality of users participating in a meeting are divided into a plurality of groups such as groups GP1 to GP4.

For example, four users U1, U2, U3, and U4 and the like belong to the group GP1, and three users U76, U11, and U23 and the like belong to the group GP2. A case in which two users U98 and U12 and the like belong to the group GP3, and five users U61, U102, U543, U53, and U44 and the like belong to the group GP4 is explained. For example, in the remote meeting system 1, a host (an administrator) of the meeting divides the plurality of users participating in the meeting into the plurality of groups. Note that the above is merely an example and, in the remote meeting system 1, the plurality of users participating in the meeting may be automatically divided into the plurality of groups. After the division into the groups, the users may be capable of changing the groups to which the users belong.

Here, the groups to which the users belong are referred to as "first group" of the users and groups other than the groups to which the users belong are referred to as "second group" of the users. For example, for the user U1, the group GP1 is the first group and the other groups GP2, GP3, GP4, and the like are the second group. For the user U76, the group GP2 is the first group and the other groups GP1, GP3, GP4, and the like are the second group.

As explained above, the first group and the second group are relative concepts. The first group for a certain user is the second group for users other than users belonging to the same group to which the user belongs. For example, the group GP1 is the first group for users belonging to the group GP1 of the users U1, U2, U3, and U4 and is the second group for users other than the users belonging to the group GP1. For example, when the user U1 changes (hereinafter also referred to as "moves") the group from the group GP1 to the group GP2, the first group for the user U1 changes to the group GP2, and the group GP1 changes to the second group.

In the following explanation, a case is explained in which it is estimated which of "person concerned" or "onlooker" a participation state of a user in a group is. "Person concerned" referred to herein corresponds to, for example, a first state that is a state in which the user is actively participating in a conversation in the group and "onlooker" corresponds to a second state that is a state other than the first state, that is, a position of not being the person concerned. Note that "person concerned" and "onlooker" are merely examples of a participation state and the participation state can be optionally set.

An overview of information processing of the present application is explained with reference to FIG. 1 based on the above premise and the like. Note that step numbers such as S11-1 illustrated in FIG. 1 are numbers (signs) for explaining respective kinds of processing and do not indicate the order of the processing. The respective kinds of processing are executed at any time according to the progress of a remote meeting.

In FIG. 1, three users U1, U12, and U23 are illustrated for explanation. However, it is assumed that a large number of users (for example, one hundred or one thousand) such as users U2 and U3 are included in the users participating in the remote meeting provided by the remote meeting system 1. In FIG. 1, the terminal device 10 used by the user U1 is represented as terminal device 10a, the terminal device 10 used by the user U12 is represented as terminal device 10b, and the terminal device 10 used by the user U23 is represented as terminal device 10c. An application (hereinafter, also referred to as for participating in the remote meeting provided by the remote meeting system 1 (hereinafter also referred to as "remote meeting application") is installed in the terminal devices 10. The users participate in the remote meeting using the remote meeting application.

In FIG. 1, the terminal devices 10 estimate preference of the users who use the terminal devices 10. The terminal devices 10 estimate preference of the users based on utterance histories of the users, matters of interest registered beforehand by the users, and the like. Details thereof are explained below. For example, the terminal device 10a used by the user U1 estimates that preference of the user U1 is preference PF1 (step S10-1). Although information indicating the preference of the users is indicated by abstract information such as "PF1" in FIG. 1, the information indicating the preference of the users may be information such as keywords indicating the preference (interests) of the users such as "animation" or "Olympics". Note that the keywords are not limited to character strings and may be abstractly expressed information (for example, numerical vectors) such as vector expression.

The terminal device 10*b* used by the user U12 estimates the preference of the user U12 is preference PF12 (step S10-2). The terminal device 10*c* used by the user U23 estimates that preference of the user U23 is preference PF23 (step S10-3). In the following explanation, when steps S10-1 to S10-3 are explained without being distinguished, steps S10-1 to S10-3 are collectively referred to as step S10. Steps S10-1 to S10-3 are executed at any time according to the progress of a remote meeting without being limited to be executed once.

The terminal devices 10 transmit and receive information concerning the remote meeting to and from the remote meeting server 100 as needed. The terminal devices 10 transmit information such as utterances or images of the users who use the terminal devices 10 to the remote meeting server 100 and receive information output about the remote meeting from the remote meeting server 100.

The remote meeting server 100 and the terminal device 10*a* used by the user U1 perform communication (transmission and reception) of information concerning the remote meeting input and output by the terminal device 10*a* (step S11-1). For example, the terminal device 10*a* transmits information such as utterances and images of the user U1 to the remote meeting server 100 and receives information output about the remote meeting from the remote meeting server 100. When having estimated the preference of the user U1, the terminal device 10*a* transmits information indicating the preference PF1 of the user U1 to the remote meeting server 100.

The remote meeting server 100 and the terminal device 10*b* used by the user U12 perform communication (transmission and reception) of information concerning the remote meeting input and output by the terminal device 10*b* (step S11-2). For example, the terminal device 10*b* transmits information such as utterances and images of the user U12 to the remote meeting server 100 and receives information output about the remote meeting from the remote meeting server 100. When having estimated the preference of the user U12, the terminal device 10*b* transmits information indicating the preference PF12 of the user U12 to the remote meeting server 100.

The remote meeting server 100 and the terminal device 10*c* used by the user U23 perform communication (transmission and reception) of information concerning the remote meeting input and output by the terminal device 10*c* (step S11-3). For example, the terminal device 10*c* transmits information such as utterances and images of the user U23 to the remote meeting server 100 and receives information output about the remote meeting from the remote meeting server 100. When having estimated the preference of the user U23, the terminal device 10*b* transmits information indicating the preference PF23 of the user U23 to the remote meeting server 100. In the following explanation, when steps S11-1 to S11-3 are explained without being distinguished, steps S11-1 to S11-3 are collectively referred to as step S11. Step S11 is a step of performing communication (transmission and reception) of information concerning the remote meeting between the remote meeting server 100 and the terminal devices 10. Steps S11-1 to S11-3 are executed at any time according to the progress of the remote meeting without being limited to be performed once. Step S11 may be performed earlier than step S10.

The remote meeting server 100 collects information received from the terminal devices 10 and executes estimation processing for estimating topics of the groups and participation states of the users (step S12). In FIG. 1, the remote meeting server 100 collects information indicated by group information LT1 to LT4 and executes the estimation processing. About the group GP1, the remote meeting server 100 estimates a topic of the group GP1 based on contents of utterances of the users U1, U2, U3, and U4 belonging to the group GP1. The remote meeting server 100 estimates that the topic of the group GP1 is a topic GT1 based on the contents of the utterances of the users U1, U2, U3, and U4 belonging to the group GP1. In FIG. 1, information indicating a topic of a group is indicated by abstract information such as "GT1". However, the information indicating the topic of the group may be information such as a keyword indicating a topic spoken in the group such as "animation" or "politics". Note that the keywords are not limited to character strings and may be abstractly expressed information (for example, numerical vectors) such as vector expression.

The remote meeting server 100 estimates participation states of the users U1, U2, U3, and U4 belonging to the group GP1. The remote meeting server 100 estimates which of a person concerned and an onlooker a participation state of each of the users U1, U2, U3, and U4 is. For example, the remote meeting server 100 estimates, for the user U1, based on utterances, participation attitudes, and the like of the user U1 in the group GP1, which of the person concerned and the onlooker a participation state of the user U1 is. In FIG. 1, the remote meeting server 100 estimates that the participation state of the user U1 is the onlooker. The remote meeting server 100 estimates that the participation state of the user U2 is the person concerned, estimates that the participation state of the user U3 is the onlooker, and estimates that the participation state of the user U4 is the person concerned. Note that details about the estimation of the participation states are explained below.

The remote meeting server 100 estimates that a topic of the group GP2 as the topic GT2 based on contents of utterances of the users U76, U11, and U23 belonging to the group GP2. The remote meeting server 100 estimates that a participation state of the user U76 is the onlooker, estimates that a participation state of the user U11 is the person concerned, and estimates that a participation state of the user U23 is the onlooker. Similarly, for the groups GP3, GP4, and the like, the remote meeting server 100 estimates topics of groups and participation states of users belonging to the groups.

Consequently, the remote meeting server 100 estimates topics of the groups GP1 to GP4 and the like and participation states of the users as indicated in the group information LT1 to LT4.

The remote meeting server 100 performs, based on similarity between preference of users and topics of groups (second groups) other than a first group to which the users belong, matching processing for determining a second group recommended to the users (hereinafter also referred to as "recommended group") (step S13). Note that, in FIG. 1, the remote meeting server 100 performs the matching processing targeting users whose participation states are the onlooker among the users. The remote meeting server 100 calculates degree of similarity between a keyword indicating preference of the users (also referred to as "participant keyword") and a keyword indicating a topic of a group (also referred to as "group keyword"). For example, the remote meeting server 100 converts keywords into vectors and calculates cosine degree of similarity among the vectors of the keywords as degree of similarity among the keywords.

For example, the remote meeting server 100 converts keywords into vectors using any model (vector conversion model) such as Word2Vec or BoW (Bag of words).

In FIG. 1, the remote meeting server 100 calculates degree of similarity between the preference PF1 of the user U1, who is an onlooker, and the topics GT2, GT3, and GT4 of the groups GP2, GP3, and GP4 other than the group GP1 to which the user U1 belongs. For example, the remote meeting server 100 calculates, as degree of similarity between the user U1 and the group GP2, cosine degree of similarity between a vector of a participant keyword indicated by the preference PF1 of the user U1 and a vector of a group keyword indicated by the topic GT2 of the group GP2. Similarly, for the groups GP3 and GP4, the remote meeting server 100 calculates, as degree of similarity with the user U1, cosine degree of similarity between a vector of a participant keyword of the user U1 and a vector of a group keyword. The remote meeting server 100 determines a group having the largest calculated degree of similarity as a recommended group to the user U1. For example, the remote meeting server 100 determines the group GP3 of the topic GT3 having the largest degree of similarity to the preference PF1 of the user U1 as the recommended group to the user U1.

The remote meeting server 100 calculates degree of similarity between the preference PF23 of the user U23, who is an onlooker, and the topics GT1, GT3, and GT4 of the groups GP1, GP3, and GP4 other than the group GP2 to which the user U23 belongs. The remote meeting server 100 determines a group having the largest calculated degree of similarity as a recommended group to the user U23. For example, the remote meeting server 100 determines the group GP1 of the topic GT1 having the largest degree of similarity to the preference PF23 of the user U23 as a recommended group to the user U23.

Similarly, the remote meeting server 100 determines recommended groups to users U3, U76, U543, U53, U44, and the like, who are other onlookers. Note that the remote meeting server 100 may not determine recommended groups to users U2, U4, U11, U98, U12, U61, U102, and the like, who are persons concerned, or may determine recommended groups to the users U2, U4, U11, U98, U12, U61, U102. The remote meeting server 100 may or may not give notification explained below to a user who is in a state of a person concerned. For example, when giving the notification explained below to the user who is the state of the person concerned, the remote meeting server 100 may give the notification to be less conspicuous compared with notification to an onlooker (for example, to be display smaller than display to the onlooker) or may give the notification in the same manner as the notification to the onlooker.

The remote meeting server 100 notifies the users of recommended groups determined by the matching processing. The remote meeting server 100 notifies a user, who is an onlooker, of recommended group to the user.

Figure 2:
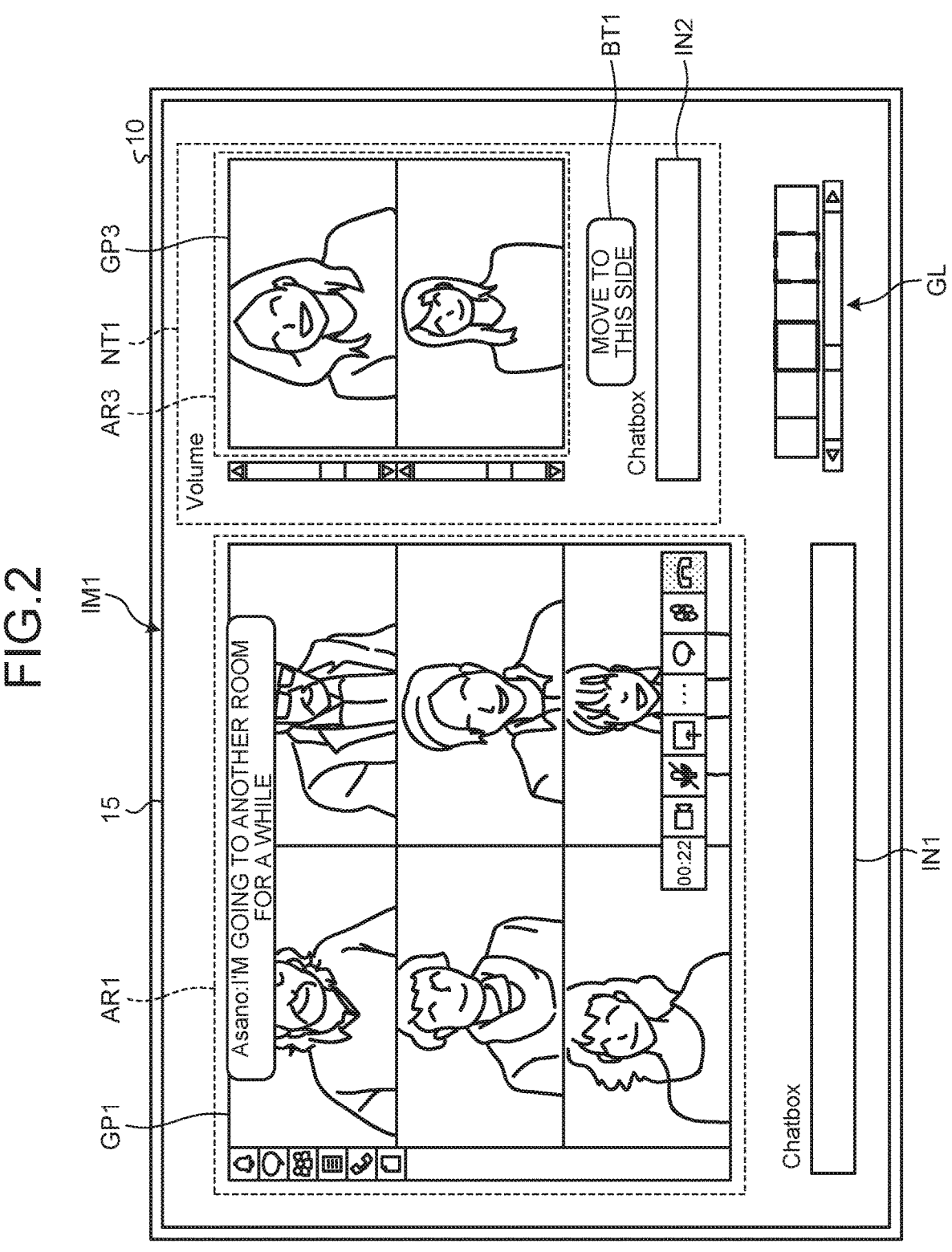
FIG. 2 is a diagram illustrating an example of display to onlookers.

For example, the remote meeting server 100 notifies the user U1 of the group GP3 that is a recommended group to the user U1 (step S14-1). For example, the remote meeting server 100 notifies the user U1 of the group GP3 by transmitting information indicating the group GP3 to the terminal device 10a used by the user U1. For example, the remote meeting server 100 notifies the user U1 of the group GP3 by transmitting information to the terminal device 10a in order to display a screen IM1 including information concerning the group GP3 illustrated in FIG. 2. Details about FIG. 2 are explained below.

The remote meeting server 100 notifies the user U23 of the group GP1, which is a recommended group to the user U23 (step S14-3). For example, the remote meeting server 100 notifies the user U23 of the group GP1 by transmitting information indicating the group GP1 to the terminal device 10c used by the user U23. For example, the remote meeting server 100 notifies the user U23 of the group GP1 by transmitting information to the terminal device 10c in order to display a screen including the information of the group GP1.

Note that, in the example illustrated in FIG. 1, since a participation state of the user U12 at that point in time is the person concerned, the terminal device 10b used by the user U12 is not notified of a recommended group. However, when the user U12 changes from the person concerned to the onlooker, the remote meeting server 100 may perform the matching processing for the user U12 and notify the user U12 of a recommended group (step S14-2). In the following explanation, when steps S14-1 to S14-3 are explained without being distinguished, steps S14-1 to S14-3 are collectively referred to as step S11. Steps S14-1 to S14-3 are executed at any time at timing when conditions are satisfied according to the progress of the remote meeting. Step S14 may be performed together with step S11.

Consequently, the remote meeting system 1 can notify participants participating in the remote meeting of appropriate information. A display example in the terminal device 10 corresponding to presence or absence of notification of a recommended group is explained below with reference to FIG. 2 to FIG. 4.

1-1-1. Display Example of Presence of Notification of Recommended Group

First, a display example of presence of notification a recommended group is explained with reference to FIG. 2. FIG. 2 is a diagram illustrating an example of display to an onlooker. FIG. 2 illustrates, as an example, display on the terminal device 10a of the user U1, who is the onlooker in FIG. 1.

On a display 15 of the terminal device 10 illustrated in FIG. 2, a screen IM1 including information concerning the group GP3, which is a recommended group to the user U1, is displayed. In addition, information concerning the group GP1, which is a group (a first group) to which the user U1 belongs, is mainly displayed on the screen IM1. The information concerning the group GP1 in the screen IM1 includes images of users participating in the group GP1. In FIG. 2, the images of the users participating in the group GP1 are displayed in an area AR1 and images of users participating in the group GP3 are displayed in an area AR3. As explained above, the images of the participants in the group GP3, which is a recommended group (a second group), is displayed on the terminal device 10 together with the images of the participants in the group GP1, which is the first group.

As illustrated in FIG. 2, the area AR1, which is a first area where the group GP1 is displayed, is larger than the area AR3, which is a second area where the group GP3 is displayed. That is, on the terminal device 10, the images of the participants in the group GP1, which is the first group, is displayed larger than the images of the participants in the group GP3, which is the recommended group (the second group). As explained above, on the terminal device 10, the images of the participants in the group GP3, which is the recommended group (the second group), is displayed in the second area smaller than the first area where the images of the participants in the group GP1, which is the first group, is displayed. Consequently, the remote meeting system 1 identifiably displays the group GP1, which is the first group, and the group GP3, which is the recommended group (the second group). For example, the remote meeting server 100 performs notification of the recommended group (the second group) to the user U1, who is notified, by transmitting output data for displaying the screen IM1 to the terminal device 10a.

A chat box IN1 for transmitting character information to the users of the group GP1 is arranged under the information concerning the group GP1 in the screen IM1. A group list GL for displaying a plurality of groups as a list is arranged on the right side of the chat box IN1 in the screen IM1. In the group list GL, a rectangle surrounded by a thick line indicates the group GP1 to which the user U1 currently belongs and a rectangle surrounded by a dotted line indicates the group GP3, which is the recommended group to the user U1. When a group is designated by mouse over or the like on the group list GL, a participant list of the designated group may be popped up.

In a notification area NT1 in the screen IM1, information concerning the group GP3, which is the recommended group to the user U1, is arranged. The information concerning the group GP3 displayed in the notification area NT1 includes images of the users participating in the group GP3. A movement button BT1 for moving to the group GP3 is arranged under the information concerning the group GP3 in the notification area NT1. For example, when the user U1 selects the movement button BT1, the group to which the user U1 belongs is changed from the group GP1 to the group GP3. A chat box IN2 for transmitting character information to the user of the group GP3 is arranged under the movement button BT1 in the notification area NT1.

A voice output in the terminal device 10 illustrated in FIG. 2 is explained. The terminal device 10 illustrated in FIG. 2 superimposes voice of the group GP3, which is the recommended group (the second group) to the user U1, on voice of the group GP1, which is the first group of the user U1, and outputs the voice.

The terminal device 10 illustrated in FIG. 2 superimposes the voice of the group GP3 with second sound volume smaller than first sound volume of the group GP1 to which the user U1 belongs. In this case, the remote meeting server 100 sets parameters such that the second sound volume of the group GP3, which is the recommended group (the second group) to the user U1, is smaller than the first sound volume of the group GP1, which is the first group of the user U1, and notifies the terminal device 10a of the parameters.

Figure 3:
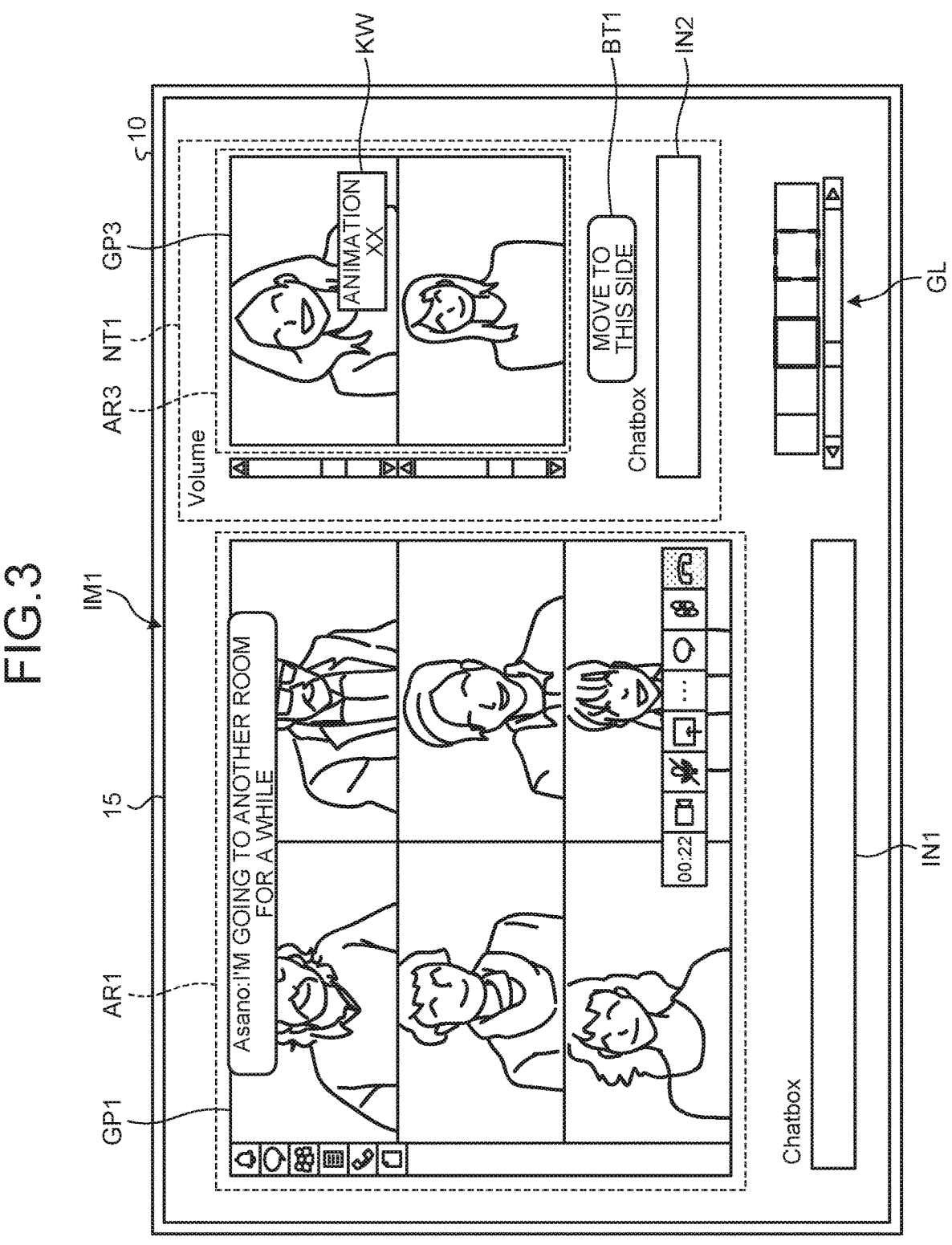
FIG. 3 is a diagram illustrating another example of display to onlookers.

Note that the display example illustrated in FIG. 2 is merely an example and any display mode can be adopted as display to the onlookers. An example of this point is explained with reference to FIG. 3. FIG. 3 is a diagram illustrating another example of display to the onlookers. Note that, in FIG. 3, explanation is omitted as appropriate for the same points as those in FIG. 2 by, for example, denoting the points with the same reference numerals and signs.

The terminal device 10 may display information indicating what kind of conversation is being held in the group GP3, which is the recommended group. In FIG. 3, the terminal device 10 displays, on a screen, as popup, a group keyword KW indicating what kind of conversation is being held in the group GP3. "Animation XX", which is the group keyword KW of the group GP3, is a keyword indicating information (a topic) indicating what kind of conversation is being held in the group GP3. Note that, although "animation XX" is abstractly illustrated in FIG. 3, "animation XX" is a character string indicating a specific animation title.

1-1-2. Display Example of Absence of Notification of Recommended Group

Figure 4:
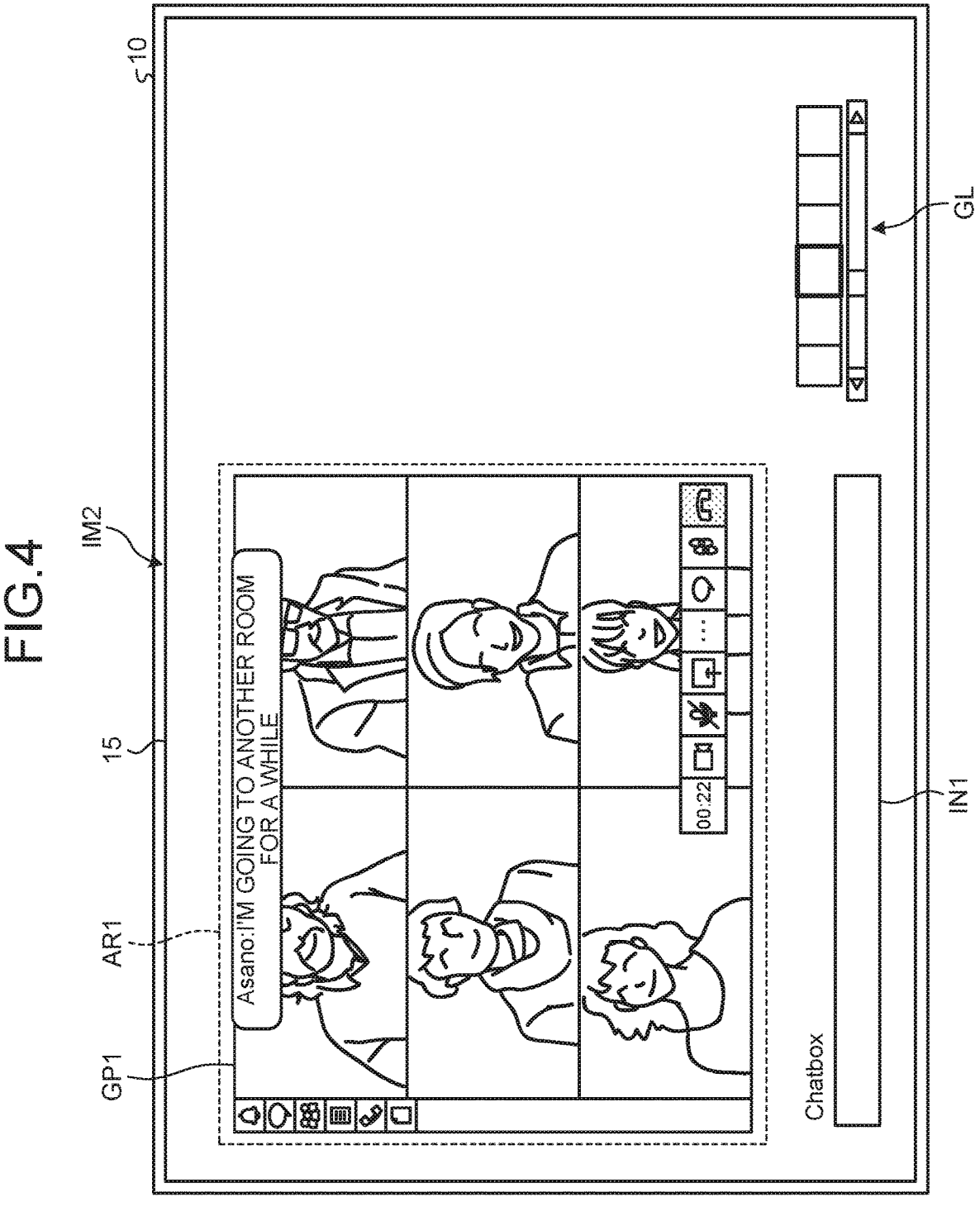
FIG. 4 is a diagram illustrating an example of display to persons concerned.

Next, a display example of absence of notification of a recommended group is explained with reference to FIG. 4. FIG. 4 is a diagram illustrating an example of display to a person concerned. FIG. 4 illustrates, as an example, display on the terminal device 10 of the user U2, who is the person concerned in FIG. 1. Note that, in FIG. 4, explanation is omitted as appropriate for the same points as those in FIG. 2 by, for example, denoting the points with the same reference numerals and signs.

On the display 15 of the terminal device 10 illustrated in FIG. 4, a screen IM2 not including information concerning a recommended group to the user U2 is displayed. As described above, the screen IM2 is different from the screen IM1 in that the notification area NT1 for notifying a user of a recommended group is not included. Note that, on the screen IM2, information concerning the group GP1, that is the group (the first group) to which the user U2 belongs, may be enlarged and displayed up to the notification area NT1 in FIG. 2. For example, the display of the notification area NT1 may be folded and hidden or a space of the notification area NT1 may be reduced. When the user U2 transitions from the person concerned to the onlooker, the notification area NT1 may be displayed at timing of the transition.

1-1-3. Background, Effects, and the Like

In the conventional remote meeting, there is a problem in that it is difficult for a plurality of people to speak at the same time and other participants are listeners while one person is uttering and utterance does not come alive when the number of participants is large. It is conceivable to divide the participants into several groups and operate the groups. However, in this case, there is also a problem that it is unknown what kinds of conversation is being held in other groups. Such a problem is conspicuous in a remote meeting in which meeting contents and progress are not determined beforehand such as a brainstorm and a party.

Therefore, in the remote meeting system 1, in a remote meeting in which a large number of people participate, speeches of participants are recognized by voice to estimate topics being spoken to allow the participant to hear voice of the participants close to preference or interests of the participants. In this case, for example, the participants may be arranged in spatially different positions and display and voice output may be performed according to a positional relation among the participants. This point is explained below.

In the remote meeting system 1, preference (interests) of the participants may be registered beforehand or may be estimated from speeches at that time. In the remote meeting system 1, in a system in which participants are divided into a plurality of groups and conversation is held, the topics are collected for each of the groups and the conversation exchanged in the group is superimposed and heard on the conversation in a group in which a user himself or herself is participating. Consequently, in the remote meeting system 1, a so-called cocktail party effect can be realized in the remote meeting.

In the remote meeting system 1, by controlling a way of superimposing voice and appearance of the voice on a screen according to a situation of being a speaker or being a listener, a participant can easily grasp topics of interest of other groups and can move among the groups and join the topics.

Note that the group in the present application is a small conference space virtually prepared in the remote meeting in which the users (the terminal devices 10) are participating and is equivalent to a breakout room in a Web conference system disclosed in Non Patent Literature 1. Note that, although a plurality of users are often participating in the group, there may be a group in which only one user is participating.

1-1-4. Participation State of User

Examples of various kinds of information, processing, and the like are explained below. First, a participation state of a user is explained. As a participation state of a user participating in the remote meeting, there are two states, that is, a state (a first state) in which the user is participating as a person concerned who is actively speaking and interacting and a state (a second state) in which the user is participating as an onlooker who is listening to others speaking. One participant participates in the meeting while transitioning between the two states.

For example, the remote meeting system 1 can estimate, based on the following information, the state (the first state) in which the user is participating as the person concerned. For example, the remote meeting system 1 can estimate the state (the first state) based on a frequency of the user speaking by himself or herself. In this case, the remote meeting system 1 estimates that a user whose frequency of speaking in a certain group in a predetermined period is equal to or larger than a threshold is a person concerned of the group. The remote meeting system 1 estimates that a user whose frequency of speaking in a certain group in a prede- termined period is smaller than a threshold is an onlooker of the group. Note that, since there are people who originally have few words, the remote meeting system 1 may change the threshold for each of users.

The remote meeting system 1 may estimate which of the person concerned and the onlooker the participation state of the user is based on information indicating that, for example, a mute state of a microphone continues, speech of another person for a topic spoken by the user himself or herself continues, the user responds or nods to speech of another person, another person is speaking to the user himself or herself on a screen (for example, a line of sight faces that part), and the like.

Note that the above is merely an example and the par- ticipation state of the user may be determined as appropriate using various kinds of information. For example, the par- ticipation state of the user may be static by, for example, being set in advance. The remote meeting system 1 may generate a model for estimating the participation state of the user by machine learning based on various kinds of infor- mation and estimate the participation state of the user using the generated model. Participation in the groups may require approval of existing participants.

1-1-5. Group to be Presented

Subsequently, an example of selection (determination) and the like of a group to be presented (of which notification is performed) to a user is explained. The remote meeting system 1 determines a recommended group to users by matching contents being spoken in the groups and prefer- ence estimation results of the users.

As explained in detail below with reference to a flowchart and the like, in the remote meeting system 1, utterance of the users is converted into text by voice recognition for each of the terminal devices 10. The remote meeting system 1 estimates preference of the terminal users. For the estimation of the preference, information such as an utterance history (a history of voice recognition results) of users in the past, matters of interest registered beforehand by the users, an action history on devices such as PCs and smartphones such as a website browsing history similar to web advertisement, and a real activity history such as jogging and aerobics (also simply referred to as "aerobics") by a smart tracker using a vital sensor or the like is used.

The utterance history of the users is a result of voice recognition of utterance of the users on a system or a history of keywords extracted the utterance history. The action history is a history of performing switching (movement) of groups and topics in the groups at that time.

As the matters of interest registered by the users before- hand, what the users are usually interested is registered in a form of, for example, professional baseball, politics, Jazz, and The Beatles as keywords and categories. The matters of interest may be selected from categories and keywords prepared in advance in the system or the users may set free keywords.

Next, the remote meeting system 1 collects, for each of the groups, text of voice recognition results of utterance of users participating in the group. The remote meeting system 1 estimates a topic of each of the groups from an utterance history of each of the groups.

The remote meeting system 1 calculates degree of simi- larity between the users who use the terminal devices 10 and the groups from preference estimation results of the terminal users and topic estimation results of the groups. Here, as a method of calculating the degree of similarity, a document classification method in natural language processing can be used. For example, the remote meeting system 1 may calculate the degree of similarity using cosine degree of similarity by using utterance and matters of interest of the users who use the terminal devices 10, words appearing in browsed Web pages and the like, and words appearing in utterance histories of the groups. The remote meeting system 1 may convert these words and sentences into vector embed- ded expressions using a machine learning technology such as deep learning, construct, through learning, a model for regressively estimating degree of similarity using the vector embedded expressions, and calculate the degree of similarity using the model. Note that the above is merely an example and the remote meeting system 1 may calculate the degree of similarity with any method if the degree of similarity between the users and the groups can be calculated.

The remote meeting system 1 selects a group having the highest degree of similarity for each of the users who use the terminal devices 10 and presents the selected group as a recommended group. Note that the remote meeting system 1 may set a threshold and, when there is no group having degree of similarity exceeding the threshold for a certain user, determine that there is no group recommended to the user. When determining that there is no recommended group, the remote meeting system 1 does not notify the user of a recommended group.

1-1-6. Notification Mode

Subsequently, an example about a notification mode is explained. First, a method of presentation (notification) of a recommended group will be described.

As a method of presenting a recommended group, presentation by voice, presentation by an image, and a combination of the voice and the images are mainly conceivable. In the presentation by voice, the remote meeting system 1 can change sound volume and combine the voice. The remote meeting system 1 superimposes voice of a recommended group mainly on voice of a group, in which the user himself or herself is participating, with sound volume smaller than sound volume of the voice to allow conversation of other group to enter ears. At this time, it is also possible to prepare a method of making it possible to individually adjust the sound volume of the voice of the recommended group for the user. As another method, a direction in which sound is heard can be changed. The remote meeting system 1 reproduces conversations of the respective groups by superimposing conversation of the group in which the user himself or herself is participating and conversation of the recommended group such that conversion of the group is heard from the front and the conversion of the recommended group is heard from the right side.

As the presentation by the image, various presentations are conceivable by devising screen design. As a first method, the remote meeting system 1 displays the camera image of the participant in the group in which the user himself or herself participates at the center of the screen, and displays a small camera image of the participant in the recommended group at the end. The display of the recommended group can be devised to be folded and hidden at timing not suitable for recommendation in relation to presentation timing explained below.

As a second method, the remote meeting system 1 can be configured such that a plurality of chat spaces are prepared in an image of a party venue style, camera images of participants present in the same chat space as the chat space of the user himself or herself are displayed and a chat space of the recommended group is displayed to be adjacent the chat space of the user on the screen. The remote meeting system 1 can also combine the first method and the second method and display the camera image of the participant in the recommended group small as well.

In the above explanation, the methods of presenting the recommended group with the voice and the image are respectively explained. However, it is also important that the presentation in these two modals is performed to be easily recognizable for the user. For example, when voice is superimposed while changing a direction in which the voice is heard for each of the groups, it is desirable that the direction in which the voice is heard and a direction in which the group is displayed on the screen correspond to each other. When the camera video of the participant in the recommended group is also displayed in addition to the camera image of the participant in the group in which the user himself or herself is participating, if the former voice and the latter voice are superimposed such that the former voice is heard from the front and the latter voice is heard from the right side, the remote meeting system 1 displays a face image of the latter participant on the right side of a face image of the former participant on the screen as well. When a group is displayed in a party-like image, the remote meeting system 1 desirably allows voice of the group to be heard from a direction in which the group is holding conversation in a party venue. Details about this point are explained below.

Subsequently, presentation (notification) timing of a recommended group is explained. Notification timing for a recommended group changes according to a participation state of a user and whether there is a group recommended to the user. As the notification timing, time when the user is participating in a group as an onlooker and time when a recommended group is present are effective. As explained above, it is also effective to devise display of the recommended group to be folded and hidden when the user becomes the person concerned as explained above. It depends on the user as well to which degree the user desires to present the recommended group. Therefore, for example, the remote meeting system 1 may present the recommended group when the user feels that a topic of a group in which the user is participating is boring and presses a button or may always present the recommended group. The remote meeting system 1 only has to enable the user to set the presentations of the recommended group.

1-1-7. Group Movement, and the Like

Subsequently, an example about group movement and the like is explained. In the remote meeting system 1, when notification (presentation) of a recommended group is performed, whether to move among groups is basically left to the user's decision. For example, it is conceivable to prepare a movement button beside the display of the recommended group and enable the user to move among groups by pressing the movement button.

In addition, in setting on a sponsor (host) side, it is also conceivable to prepare setting for the system to automatically move among groups. As timing for performing the movement, it is conceivable to perform the movement, at a certain time interval, at timing when a group with a high recommendation degree is present for each of individual participants. This function is considered to be effective at meetings such as a brainstorming and a party.

When the user himself or herself is a person concerned, for example, when another user in a participating group is speaking to the user himself or herself while looking at the user himself or herself, it is conceivable to add a function of imposing restriction such that the user cannot move.

Furthermore, in the remote meeting system 1, when a participant moves, various modes can be adopted for appearance of the group to other participants. In the group, when a certain participant moves, there are several methods are conceivable about how other participants are notified of the movement.

For example, about the appearance to the other participants of the group, no notification is performed, the participant disappears (fades out) from a camera image of a participant list, and only the notification of the fact of exit such as "Mr. XX has exited" is performed. Note that the above is merely an example and, the appearance to the other participants of the group, a message can be left when an exiting person moves to the recommended group and the message may be presented. In this case, a template message may appear in a chat box at the time of exit and a message to be sent to other participants may be selected from the chat box.

Various modes can be adopted about appearance to the other participants of a group to which a participant moves. Several methods are also conceivable for notification to other participants of a group to which a new participant moves.

For example, about the appearance to the other participants of the group to which the participant moves, notification may be the same as notification at the time when a new participant usually increases. For example, no notification is performed, notification of a message participation such as "Mr. XX has participated anew" is performed, notification of movement with interest in a topic in this group is performed, notification of a message such as "a user seems to have participated with interest in a topic in this group" is performed. At this time, when there are many participants who meet for the first time in a meeting such as a party, the remote meeting system 1 may perform notification of profile information of a user himself or herself who has moved to a group.

Various modes can also be adopted for a group to which utterance is transmitted. As means for sending a message to a group in which a user participates, means voice and text (chat) is generally used. Since conversations are respective held on different topics in different groups, it seems not common to simultaneously send the same message to a plurality of groups. However, it is possible to switch the plurality of groups and send the message. Therefore, a communication mode is also conceivable in which messages are continuously exchanged by voice among groups currently participating and text messages are sent to a recommended group. Through the processing explained above, the remote meeting system 1 can notify participants participating in a remote meeting of appropriate information.

1-2. Configuration of Remote Meeting System According to Embodiment

Figure 5:
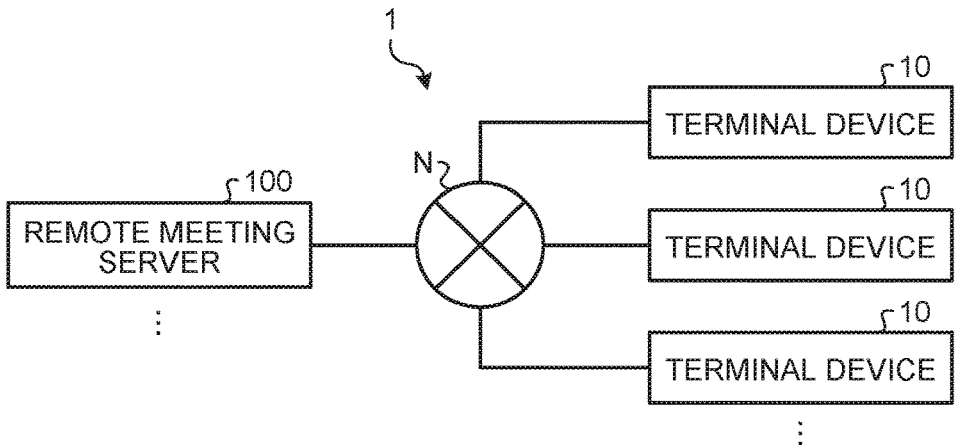
FIG. 5 is a diagram illustrating a configuration example of a remote meeting system according to the embodiment of the present disclosure.

The remote meeting system 1 illustrated in FIG. 5 is explained. As illustrated in FIG. 5, the remote meeting system 1 includes the remote meeting server 100 and the plurality of terminal devices 10. The remote meeting server 100 and each of the plurality of terminal devices 10 are communicably connected by wire or radio via a predetermined communication network (a network N). FIG. 5 is a diagram illustrating a configuration example of a remote meeting system according to the embodiment. Note that, although only three terminal devices 10 are illustrated in FIG. 5, the remote meeting system 1 includes terminal devices 10 whose number is equal to or larger than the number of users participating in the remote meeting. The remote meeting system 1 illustrated in FIG. 5 may include a plurality of remote meeting servers 100.

The terminal device 10 is a device used by a user participating in the remote meeting. The terminal device 10 outputs information concerning the remote meeting. The terminal device 10 displays an image (a video) of the remote meeting and outputs voice of the remote meeting by voice. For example, the terminal device 10 transmits utterance and an image (a video) of a user to the remote meeting server 100 and receives voice and an image (a video) of the remote meeting from the remote meeting server 100.

The terminal device 10 receives input by the user. The terminal device 10 receives a voice input by utterance of the user or input by operation of the user. The terminal device 10 may be any device if the device is capable of implementing processing in the embodiment. The terminal device 10 may be any device if the device has a function of performing information display, voice output, and the like of the remote meeting. For example, the terminal device 10 may be a device such as a notebook PC (Personal Computer), a tablet terminal, a desktop PC, a smartphone, a smart speaker, a television, a mobile phone, or a PDA (Personal Digital Assistant).

The terminal device 10 has a function of voice recognition. For example, the terminal device 10 has functions of natural language understanding (NLU) and automatic speech recognition (ASR). The terminal device 10 may include software modules for voice signal processing, voice recognition, utterance semantic analysis, interaction control, and the like. For example, the terminal device 10 may convert utterance of a user into text and estimate utterance content and preference of the user using the converted utterance (that is, character information of the utterance). Note that the terminal device 10 may communicate with a voice recognition server having a function of natural language understanding and automatic speech recognition and acquire utterance converted into text by the voice recognition server or information indicating estimated utterance content or preference from the voice recognition server.

The remote meeting system 1 may include an administrator terminal used by a host (an administrator) of a remote meeting (a meeting). Note that one terminal device 10 among the plurality of terminal devices 10 may be an administrator terminal used by the administrator. For example, the administrator may operate the terminal device 10, which is the administrator terminal, to invite users to a meeting or divide users participating in the meeting into groups.

The remote meeting server 100 is a computer used to provide a remote meeting service to the user. When the user is an onlooker, the remote meeting server 100 is an information processing device that performs notification of a group matching preference of the user among groups other than a group to which the user belongs. The remote meeting server 100 may have a function of voice recognition such as natural language understanding and automatic speech recognition. For example, the remote meeting server 100 may convert utterance of the user into text and estimate utterance content and preference of the user using the utterance converted into the text (that is, character information of the utterance).

1-3. Configuration of Information Processing Device According to Embodiment

Figure 6:
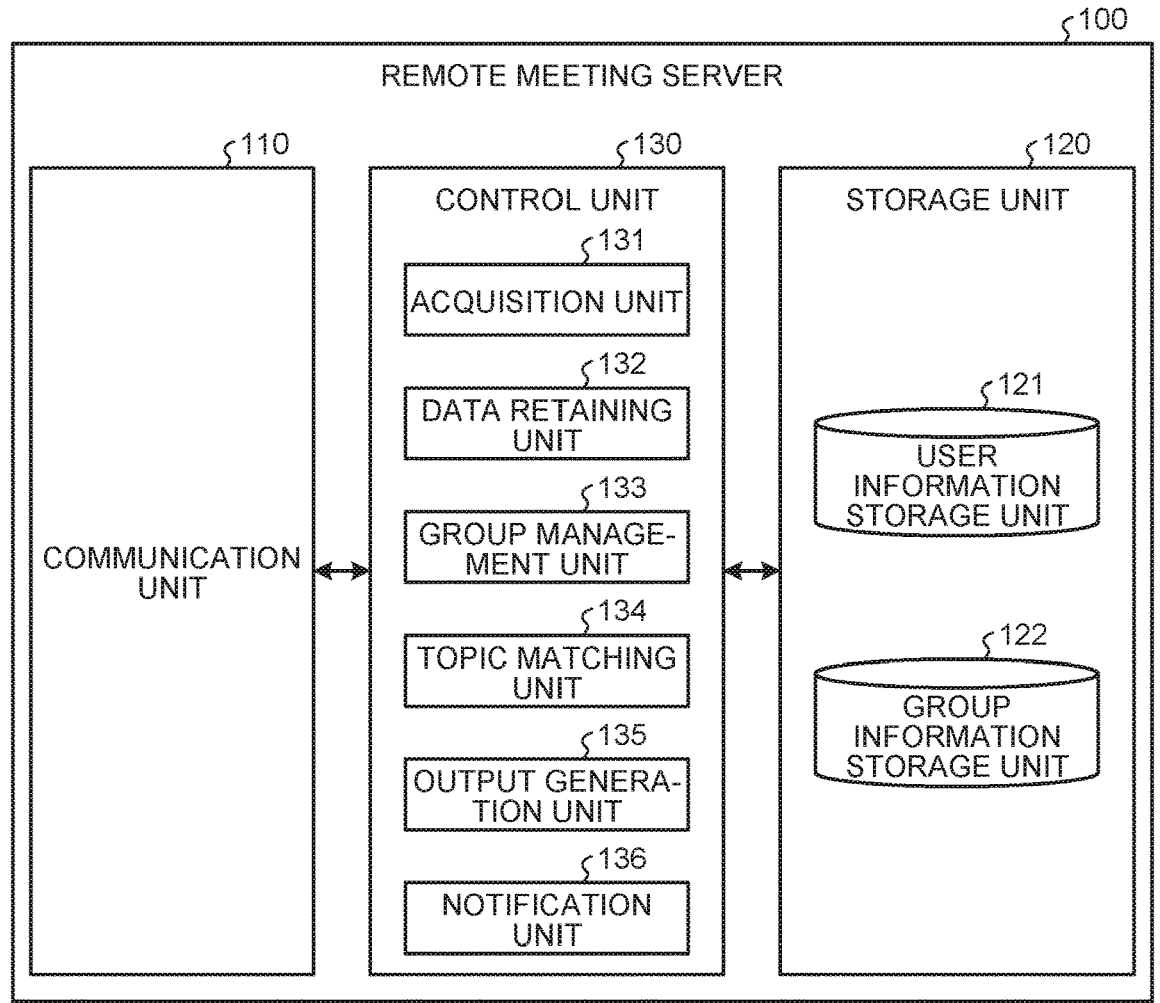
FIG. 6 is a diagram illustrating a configuration example of a remote meeting server according to the embodiment of the present disclosure.

Subsequently, a configuration of the remote meeting server 100, which is an example of an information processing device that executes information processing according to the embodiment, is explained. FIG. 6 is a diagram illustrating a configuration example of the remote meeting server according to the embodiment of the present disclosure.

As illustrated in FIG. 6, the remote meeting server 100 includes a communication unit 110, a storage unit 120, and a control unit 130. Note that the remote meeting server 100 may include an input unit (for example, a keyboard or a mouse) that receives various kinds of operation from the administrator or the like of the remote meeting server 100 and a display unit (for example, a liquid crystal display) for displaying various kinds of information.

The communication unit 110 is implemented by, for example, an NIC (Network Interface Card). The communication unit 110 is connected to the network N (see FIG. 5) by wire or radio and transmits and receives information to and from another information processing device such as the terminal device 10. The communication unit 110 may transmit and receive information to and from a user terminal (not illustrated) used by the user.

The storage unit 120 is realized by a semiconductor memory element such as a RAM (Random Access Memory) or a flash memory or a storage device such as a hard disk or an optical disk. As illustrated in FIG. 6, the storage unit 120 according to the embodiment includes a user information storage unit 121 and a group information storage unit 122.

The user information storage unit 121 according to the embodiment stores various kinds of information concerning users. For example, the user information storage unit 121 stores information concerning users participating in a remote meeting. The user information storage unit 121 stores information concerning interests and preference of the users. The user information storage unit 121 stores preference estimation results for the users in association with the users. The user information storage unit 121 stores user information corresponding to information for identifying the users (user IDs or the like) in association with each other.

Figure 7:
FIG. 7 is a diagram illustrating an example of a group information storage unit according to the embodiment of the present disclosure.

The group information storage unit 122 according to the embodiment stores various kinds of information concerning groups. The group information storage unit 122 stores various kinds of information concerning a plurality of groups corresponding to each of a plurality of groups in a remote meeting. FIG. 7 is a diagram illustrating an example of the group information storage unit according to the embodiment of the present disclosure. FIG. 7 illustrates an example of the group information storage unit 122 according to the embodiment. In the example illustrated in FIG. 7, the group information storage unit 122 includes items such as "group ID", "topic", "participant", and "state".

The "group ID" indicates identification information for identifying a group. The "topic" indicates a topic in a group corresponding thereto. For example, the "topic" indicates a topic estimated based on content of a dialogue in the group. Although FIG. 6 illustrates an example in which conceptual information such as "GT1" is stored in the "topic", in practice, specific information such as keywords indicating topics in the group such as "animation" and "Olympics" is stored.

The "participant" indicates a participant in the group. For example, in the "participant", information (a user ID or the like) for identifying the participant (a user) belonging to the group is stored. The "state" indicates states of participants. Although FIG. 7 illustrates a case in which a "person concerned" or an "onlooker" is stored in the "state", any setting is possible for the state other than the "person concerned" and the "onlooker".

In the example illustrated in FIG. 7, it is indicated that a user (a user U1) identified by a user ID "U1", a user (a user U2) identified by a user ID "U2", a user (a user U3) identified by a user ID "U3", a user (a user U4) identified by a user ID "U4", and the like belong to a group (a group GP1) identified by a group ID "GP1" as participants. It is indicated that a topic of the group GP1 is a topic GT1. In the group GP1, it is indicated that two users U2 and U4 are persons concerned and two users U1 and U3 are onlookers at that point in time.

Note that the group information storage unit 122 is not limited to the above and may store various kinds of information according to purposes.

The storage unit 120 may store various kinds of information other than the above. For example, the storage unit 120 stores various kinds of information concerning a remote meeting. The storage unit 120 stores various data for providing output data to the terminal device 10. For example, the storage unit 120 stores various kinds of information used to generate information to be displayed on the terminal device 10 of a user participating in the remote meeting. For example, the storage unit 120 stores information concerning content displayed by an application (a remote meeting application or the like) installed in the terminal device 10. For example, the storage unit 120 stores information concerning content displayed by the remote meeting application. Note that the above is merely an example and the storage unit 120 may store various kinds of information used to provide a remote meeting service to the user.

Referring back to FIG. 6, the explanation is continued. The control unit 130 is implemented by, for example, a CPU (Central Processing Unit), an MPU (Micro Processing Unit), or the like executing a program (for example, an information processing program according to the present disclosure) stored inside the remote meeting server 100 with a RAM (Random Access Memory) or the like as a work area. The control unit 130 is implemented by an integrated circuit such as an ASIC (Application Specific Integrated Circuit) or an FPGA (Field Programmable Gate Array).

As illustrated in FIG. 6, the control unit 130 includes an acquisition unit 131, a data retaining unit 132, a group management unit 133, a topic matching unit 134, an output generation unit 135, and a notification unit 136 and realizes or executes a function and an action of information processing explained below. Note that an internal configuration of the control unit 130 is not limited to the configuration illustrated in FIG. 6 and may be another configuration if the configuration is a configuration for performing information processing explained below. A connection relation among the processing units included in the control unit 130 is not limited to the connection relation illustrated in FIG. 6 and may be another connection relation.

The acquisition unit 131 acquires various kinds of information. The acquisition unit 131 acquires various kinds of information from an external information processing device. The acquisition unit 131 acquires various kinds of information from the terminal device 10. The acquisition unit 131 acquires, from the terminal device 10, various kinds of information detected by an operation unit 16 (explained below with reference to FIG. 7) of the terminal device 10. The acquisition unit 131 acquires various kinds of information detected by a voice input unit 12 (explained below with reference to FIG. 7) from the terminal device 10.

The acquisition unit 131 acquires various kinds of information from the storage unit 120. The acquisition unit 131 acquires various kinds of information from the user information storage unit 121 and the group information storage unit 122. The acquisition unit 131 acquires various kinds of information calculated by the data retaining unit 132. The acquisition unit 131 acquires various kinds of information determined by the group management unit 133.

The acquisition unit 131 acquires information concerning a remote meeting. The acquisition unit 131 acquires information such as utterance and an image of a user. The acquisition unit 131 receives, from the terminal device 10, information such as utterance and an image of a user who uses the terminal device 10. The acquisition unit 131 receives information indicating an estimation result of preference of the user from the terminal device 10. The acquisition unit 131 receives information such as image and voice, a voice recognition result, and a preference estimation result of the user from the terminal device 10.

The data retaining unit 132 executes processing concerning data retention. The data retaining unit 132 accumulates information such as image and voice, voice recognition results, and preference estimation results transmitted from the terminal devices 10. The data retaining unit 132 stores, in the storage unit 120, the information such as the image and voice, the voice recognition results, and the preference estimation results transmitted from the terminal devices 10.

The group management unit 133 executes processing concerning group management. The group management unit 133 manages a group in which users of the terminal devices 10 are participating. The group management unit 133 uses voice recognition results of participants for each of groups and estimates a topic of conversation being held in the group.

The group management unit 133 functions as an estimation unit that performs estimation processing. The group management unit 133 estimates participation states of the users participating in the group. When a plurality of participants participating in a remote meeting are divided into a plurality of groups and can have conversation in the groups, the group management unit 133 estimates a topic of conversation in a group from speech of a participant belonging to the group. The group management unit 133 estimates a participation state of one participant in a first group. The group management unit 133 estimates whether a state of one participant is a first state that is a state of actively participating or a second state that is a state other than the first state.

The topic matching unit 134 executes processing concerning topic matching. The topic matching unit 134 executes the matching processing using voice recognition result and preference estimation results from the terminal devices 10 and topic estimation results for each of the groups estimated by the group management unit 133. The topic matching unit 134 matches, other than groups in which the users of the terminal devices 10 are participating, a group, a topic of which is similar to preference of the users.

The topic matching unit 134 performs the matching processing based on similarity between a keyword indicating preference of a user and a keyword indicating topics of groups (second groups) other than a group (a first group) to which the user belongs. The topic matching unit 134 determines whether a comparison result between the keyword indicating the preference of the user and the keyword indicating the topics of the second groups satisfies a condition concerning similarity. The topic matching unit 134 determines a group having the largest degree of similarity among a plurality of second groups as a group (a notification group) of which the user is notified.

Note that the topic matching unit 134 may use a threshold. In this case, the topic matching unit 134 determines whether degree of similarity between the keyword indicating the preference of the user and the keyword indicating the topics of the second groups is equal to or larger than a predetermined threshold. The topic matching unit 134 determines, as a group of which the user is notified (a notification group), a group having degree of similarity equal to or larger than the predetermined threshold among the plurality of second groups. For example, when there is a plurality of groups having degree of similarity equal to or larger than the predetermined threshold among the plurality of second groups, the topic matching unit 134 determines a group having the largest degree of similarity as the group of which the user is notified (the notification group).

The output generation unit 135 generates various kinds of information. The output generation unit 135 generates various kinds of information based on information from an external information processing device or information stored in the storage unit 120. The output generation unit 135 generates various kinds of information based on information from other information processing devices such as the terminal devices 10. The output generation unit 135 generates various kinds of information based on information stored in the user information storage unit 121 or the group information storage unit 122. The output generation unit 135 generates, based on the information determined by the group management unit 133, various kinds of information to be displayed on the terminal device 10.

The output generation unit 135 adjusts the information into a necessary output form together with voice and an image of the group matched by the topic matching unit 134 in addition to voice and images of the groups in which the users of the terminal devices 10 are participating. For example, the output generation unit 135 adjusts various parameters according to a group to which a user belongs, a participation state of the user, and the like. For example, the output generation unit 135 adjusts the parameters according to whether the user is a person concerned or an onlooker. For example, the output generation unit 135 may generate information to be provided to the terminal device 10 using various technologies concerning a remote meeting such as a Web conference.

The output generation unit 135 generates output data to be provided to the terminal device 10 using the adjusted parameters. The output generation unit 135 generates output data used for information output of the remote meeting in the terminal device 10. For example, the output generation unit 135 generates output data including parameters indicating sound volume of groups, arrangement positions and sizes of images of the groups, and the like.

The output generation unit 135 generates output data for superimposing voice of a participant in a second group on voice of a participant in a first group. The output generation unit 135 generates output data for superimposing the voice of the participant in the second group with the second sound volume smaller than the first sound volume of the first group. The output generation unit 135 generates output data for displaying an image of the participant in the second group together with an image of the participant in the first group. The output generation unit 135 generates output data for identifiably displaying the first group and the second group. The output generation unit 135 generates output data for displaying the image of the participant in the second group in a second area smaller than a first area for displaying the image of the participant in the first group.

When performing notification of the voice and the image of the participant in the second group, the output generation unit 135 generates output data for performing notification of a correspondence relation between the voice and the image of the participant in the second group in a recognizable mode. The output generation unit 135 generates output data of which notification is performed in a mode in which the voice of the participant in the second group is output from a direction corresponding to the relation between the display positions of the first group and the second group.

The output generation unit 135 may generate, as output data, a display screen (content) to be displayed on the terminal device 10. For example, the output generation unit 135 may generate a screen (content) to be provided to the terminal device 10 using various technologies such as Java (registered trademark) as appropriate. Note that the output generation unit 135 may generate a screen (content) to be provided to the terminal device 10 based on a format such as CSS, JavaScript (registered trademark), or HTML. For example, the output generation unit 135 may generate a screen (content) in various formats such as JPEG (Joint Photographic Experts Group), GIF (Graphics Interchange Format), and PNG (Portable Network Graphics).

The notification unit 136 executes processing concerning notification to the user. The notification unit 136 transmits information of which notification is performed to the terminal device 10. The notification unit 136 transmits the information generated by the output generation unit 135 to the terminal device 10. The notification unit 136 transmits the output data generated by the output generation unit 135 to the terminal device 10. The notification unit 136 transmits information indicating the group matched by the topic matching unit 134 to the terminal device 10. When a second group is determined for a user by the topic matching unit 134 and the user is an onlooker, the notification unit 136 determines that a condition is satisfied and gives notification to the user.

When a topic of a second group that is a group other than a first group that is a group to which one participant belongs and preference of the one participant satisfy a condition concerning similarity, the notification unit 136 notifies the one participant of the second group. The notification unit 136 changes notification handling concerning the second group according to a participation state of the one participant in the first group estimated by the group management unit 133.

The notification unit 136 changes a notification mode of the second group to the one participant according to whether the one participant is in a first state or a second state. The notification unit 136 changes notification timing of the second group to the one participant according to whether the one participant is in the first state or the second state. The notification unit 136 changes a display mode of the second group for the one participant according to whether the one participant is in the first state or the second state.

When the one participant is in the second state, the notification unit 136 notifies the one participant of the second group. The notification unit 136 notifies the one participant of the second group at a timing when a participation state of the one participant transitions from the first state to the second state. The notification unit 136 superimposes voice of a participant in the second group on voice of a participant in the first group. The notification unit 136 superimposes the voice of the participant in the second group with second sound volume smaller than first sound volume of the first group.

The notification unit 136 displays an image of the participant in the second group together with an image of a participant in the first group. The notification unit 136 identifiably displays the first group and the second group. The notification unit 136 displays the image of the participant in the second group in a second area smaller than a first area when the image of the participant in the first group is displayed.

When notification of voice and an image of the participant in the second group is performed, the notification unit 136 performs notification of a correspondence relation between the voice and the image of the participant in the second group in a recognizable mode. The notification unit 136 performs notification of the correspondence relation in a mode in which the voice of the participant in the second group is output from a direction corresponding to a relation between display positions of the first group and the second group.

When a group keyword, which is a keyword indicating a topic of the second group, and a participant keyword, which is a keyword indicating preference of one participant, satisfy a condition concerning similarity, the notification unit 136 notifies the one participant of the second group. When a comparison result between the group keyword of the second group and the participant keyword of the one participant satisfies a condition concerning similarity, the notification unit 136 notifies the one participant of the second group. When the degree of similarity between the group keyword of the second group and the participant keyword of the one participant is equal to or larger than a predetermined threshold, the notification unit 136 notifies the one participant of the second group.

1-4. Configuration of Terminal Device According to Embodiment

Figure 8:
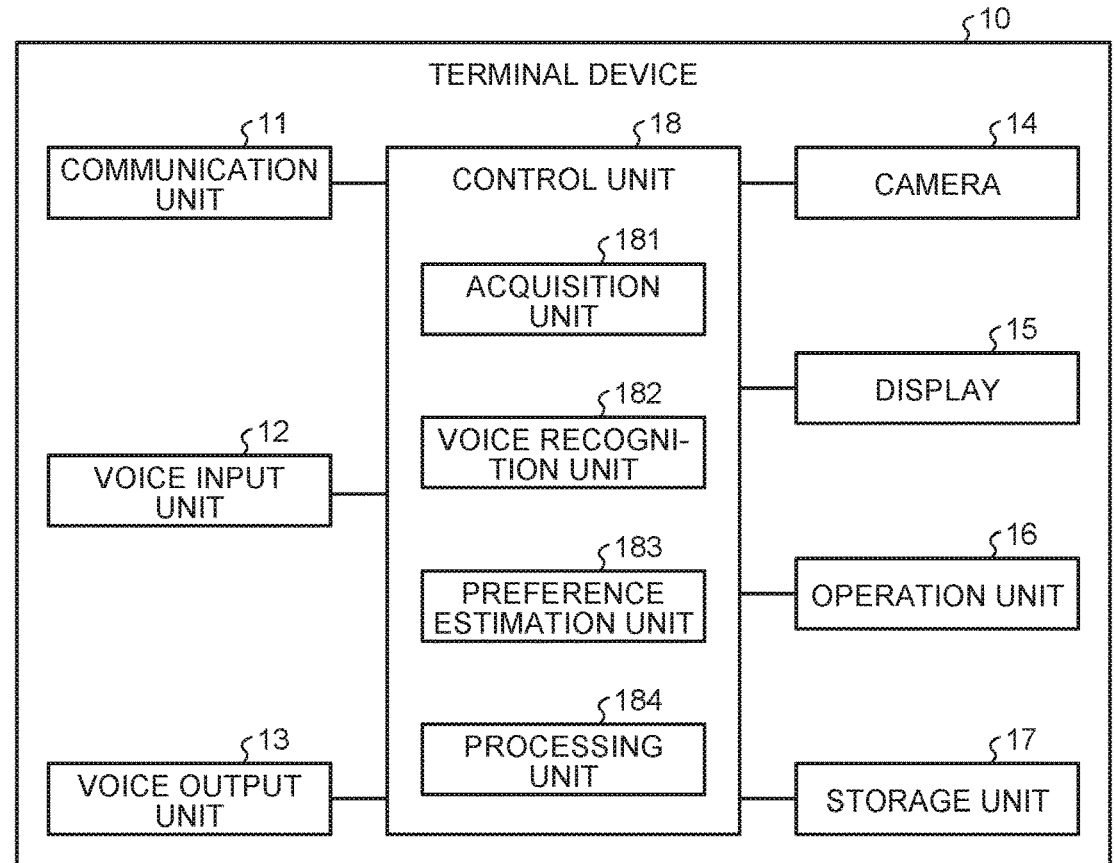
FIG. 8 is a diagram illustrating a configuration example of a terminal device according to the embodiment of the present disclosure.

Subsequently, a configuration of the terminal device 10, which is an example of an information processing device that executes information processing according to the embodiment, is explained. FIG. 8 is a diagram illustrating a configuration example of the terminal device according to the embodiment of the present disclosure.

As illustrated in FIG. 8, the terminal device 10 includes a communication unit 11, a voice input unit 12, a voice output unit 13, a camera 14, a display 15, an operation unit 16, a storage unit 17, and a control unit 18.

The communication unit 11 is implemented by, for example, an NIC or a communication circuit. The communication unit 11 is connected to a predetermined communication network (a network) by wire or radio and transmits and receives information to and from an external information processing device. For example, the communication unit 11 is connected to a predetermined communication network by wire or radio and transmits and receives information to and from the remote meeting server 100.

The voice input unit 12 is, for example, a microphone and detects voice. For example, the voice input unit 12 detects utterance of a user. Note that the voice input unit 12 may have any configuration if the voice input unit 12 is capable of detecting utterance information of the user necessary for processing.

The voice output unit 13 is implemented by a speaker that outputs voice and is an output device for outputting various kinds of information as voice. The voice output unit 13 outputs, as voice, content provided from the remote meeting server 100. For example, the voice output unit 13 outputs voice corresponding to information displayed on the display 15. The terminal device 10 inputs and outputs voice with the voice input unit 12 and the voice output unit 13.

The camera 14 includes an image sensor that detects an image. The camera 14 photographs a user participating in a remote meeting. For example, when the terminal device 10 is a notebook computer, the camera 14 may be built in the terminal device 10 and arranged above the display 15. For example, in the case of a smartphone, the camera 14 may be an in-camera built in the terminal device 10.

The display 15 is a display screen of a tablet terminal or the like implemented by, for example, a liquid crystal display or an organic EL (Electro-Luminescence) display and is a display device (a display unit) for displaying various kinds of information.

The display 15 displays various kinds of information concerning the remote meeting in which the user is participating. The display 15 displays content. The display 15 displays various kinds of information received from the remote meeting server 100. The display 15 outputs the information concerning the remote meeting received from the remote meeting server 100. The display 15 displays information of a group to which the user belongs. The terminal device 10 inputs and outputs images with the camera 14 and the display 15.

The operation unit 16 receives various kinds of operation of the user. In the example illustrated in FIG. 8, the operation unit 16 is a keyboard, a mouse, or the like. The operation unit 16 may include a touch panel that can realize functions equivalent to the functions of the keyboard and the mouse.

In this case, the operation unit 16 receives various kinds of operation from the user via a display screen with functions of the touch panel realized by various sensors. For example, the operation unit 16 receives the various kinds of operation from the user via the display 15.

For example, the operation unit 16 receives operation such as designation operation of the user via the display 15 of the terminal device 10. Note that, as a detection scheme for operation of the user by the operation unit 16, a capacitance scheme is mainly adopted in a tablet terminal. However, any scheme such as a resistive film scheme, a surface acoustic wave scheme, an infrared scheme, and an electromagnetic induction scheme, which are other detection scheme, if operation of the user can be detected and the functions of the touch panel can be realized.

The keyboard, the mouse, the touch panel, and the like explained above are merely examples. The terminal device 10 is not limited to the above and may have a configuration for receiving (detecting) various kinds of information as inputs. For example, the terminal device 10 may have a line-of-sight sensor that detects a line of sight of the user. The line-of-sight sensor detects the line-of-sight direction of the user using an eye tracking technology based on detection results of, for example, the camera 14 and an optical sensor and a motion sensor (both of which are not illustrated) mounted on the terminal device 10. The line-of-sight sensor determines, based on the detected line-of-sight direction, a gazing area at which the user is gazing on the screen. The line-of-sight sensor transmits line-of-sight information including the determined gazing area to the remote meeting server 100. For example, the terminal device 10 may include a motion sensor that detects a gesture and the like of the user. The terminal device 10 may receive, with the motion sensor, operation by the gesture of the user.

The storage unit 17 is implemented by a semiconductor memory element such as a RAM (Random Access Memory) or a flash memory or a storage device such as a hard disk or an optical disk. The storage unit 17 stores, for example, various kinds of information received from the remote meeting server 100. The storage unit 17 stores, for example, information concerning an application (for example, a remote meeting application) installed in the terminal device 10, for example, a program.

The storage unit 17 stores information concerning the user. The storage unit 17 stores various kinds of information used for estimation of preference of the user. The storage unit 17 stores an utterance history (a history of a voice recognition result) and an action history of the user. The storage unit 17 stores matters of interest registered beforehand by the user. The storage unit 17 stores a history of actions performed by the user using a device such as the terminal device 10. The storage unit 17 stores a behavior history of the user on the Internet such as a Web page browsing history. The storage unit 17 stores an activity history of a real user such as jogging or aerobics by a smart tracker using a vital sensor or the like.

Here, the utterance history of the user is a result of voice recognition of utterance of the user on the system or a history of keywords extracted the utterance history. The action history includes a history of switching (changing) groups and topics in the groups at that time. As the matters of interest registered by the users beforehand, what the users are usually interested is registered in a form of, for example, professional baseball, politics, Jazz, and The Beatles as keywords and categories. Note that the matters of interests may be selected from categories and keywords prepared in advance in the system or the users may be capable of setting the matters of interest as free keywords.

The storage unit 17 stores information concerning a voice recognition application (program) for realizing a voice recognition function. For example, the terminal device 10 is capable of executing voice recognition by starting the voice recognition application (also simply referred to as "voice recognition"). The storage unit 17 stores various kinds of information used for the voice recognition. The storage unit 17 stores information concerning a dictionary used for the voice recognition dictionary (a voice recognition dictionary). The storage unit 17 stores information concerning a plurality of voice recognition dictionaries.

The control unit 18 is a controller, and is implemented by various programs stored in a storage device such as the storage unit 17 inside the terminal device 10 being executed by, for example, a CPU or an MPU using a RAM as a work area. For example, the various programs include a program of an application (for example, a remote meeting application) for performing information processing. The control unit 18 is a controller and is implemented by an integrated circuit such as an ASIC or an FPGA.

As illustrated in FIG. 8, the control unit 18 includes an acquisition unit 181, a voice recognition unit 182, a preference estimation unit 183, and a processing unit 184 and realizes or executes a function and an action of information processing explained below. Note that an internal configuration of the control unit 18 is not limited to the configuration illustrated in FIG. 8 and may be another configuration if the configuration is a configuration for performing information processing explained below. A connection relation among the processing units included in the control unit 18 is not limited to the connection relation illustrated in FIG. 8 and may be another connection relation.

The acquisition unit 181 acquires various kinds of information. For example, the acquisition unit 181 acquires various kinds of information from an external information processing device. For example, the acquisition unit 181 stores the acquired various kinds of information in the storage unit 17. The acquisition unit 181 acquires operation information of the user received by the operation unit 16.

The acquisition unit 181 acquires utterance information of the user. The acquisition unit 181 acquires utterance information of the user detected by the voice input unit 12.

The acquisition unit 181 receives information from the remote meeting server 100 via the communication unit 11. The acquisition unit 181 receives information provided by the remote meeting server 100. The acquisition unit 181 receives content from the remote meeting server 100.

The voice recognition unit 182 executes various kinds of processing concerning voice recognition. The voice recognition unit 182 executes voice recognition processing using the information stored in the storage unit 17. The voice recognition unit 182 converts utterance of the user into character information to thereby convert voice of the user utterance into text. The voice recognition unit 182 can be implemented by using an existing utterance semantic analysis technology.

The voice recognition unit 182 analyzes content of the utterance of the user. The voice recognition unit 182 estimates content of the utterance of the user by analyzing the utterance of the user using various conventional technologies as appropriate. For example, the voice recognition unit 182 analyzes the content of the utterance of the user with functions of natural language understanding (NLU) and automatic speech recognition (ASR).

The voice recognition unit 182 estimates (specifies) the content of the utterance of the user with a semantic analysis using character information corresponding to the utterance of the user. For example, the voice recognition unit 182 estimates the content of the utterance of the user corresponding to the character information by analyzing the character information using various conventional technologies such as a syntax analysis as appropriate.

The preference estimation unit 183 executes processing for estimating preference of the user. The preference estimation unit 183 estimates preference of the user using an action history of the user. The preference estimation unit 183 estimates preference of the user using an utterance history of the user. The preference estimation unit 183 estimates preference of the user based on utterance of the user. The preference estimation unit 183 estimates preference of the user at that point in time using various kinds of information such as utterance content converted into text and items of interest of the user registered beforehand.

The preference estimation unit 183 estimates preference of the user using the various kinds of information stored in the storage unit 17. For example, the preference estimation unit 183 estimates preference of the user using an utterance history (a history of voice recognition results) and an action history of the user. The preference estimation unit 183 estimates preference of the user using matters of interest registered by the user beforehand. The preference estimation unit 183 estimates preference of the user using a history of actions performed by the user using a device such as the terminal device 10. The preference estimation unit 183 estimates preference of the user using an action history on the Internet of the user such as a Web page browsing history. The preference estimation unit 183 estimates preference of the user using an activity history of a real user such as jogging or aerobics by a smart tracker using a vital sensor or the like.

The processing unit 184 executes various kinds of processing. The processing unit 184 displays various kinds of information via the display 15. For example, the processing unit 184 controls display on the display 15. The processing unit 184 outputs various kinds of information as voice via the voice output unit 13. For example, the processing unit 184 controls the voice output of the voice output unit 13.

The processing unit 184 outputs information received by the acquisition unit 181. The processing unit 184 outputs content provided from the remote meeting server 100. The processing unit 184 outputs content received by the acquisition unit 181 via the voice output unit 13 or the display 15. The processing unit 184 displays the content via the display 15. The processing unit 184 outputs the content as voice via the voice output unit 13. The processing unit 184 functions as a notification unit that notifies the user of a second group when a topic of the second group and preference of the user satisfy a condition concerning similarity. The processing unit 184 notifies the user of a recommended group via the voice output unit 13 or the display 15.

The processing unit 184 transmits various kinds of information to an external information processing device via the communication unit 11. The processing unit 184 transmits various kinds of information to the remote meeting server 100. The processing unit 184 transmits various kinds of information stored in the storage unit 17 to the external information processing device. The processing unit 184 transmits various kinds of information acquired by the acquisition unit 181 to the remote meeting server 100. The processing unit 184 transmits sensor information acquired by the acquisition unit 181 to the remote meeting server 100.

The processing unit 184 transmits operation information of the user received by the operation unit 16 to the remote meeting server 100. The processing unit 184 transmits information such as utterance and an image of the user, who uses the terminal device 10, to the remote meeting server 100.

Note that the kinds of processing by the control unit 18 explained above may be realized by, for example, JavaScript (registered trademark). When the processing such as the information processing by the control unit 18 explained above is performed by a predetermined application, the unit of the control unit 18 may be implemented by, for example, a predetermined application. For example, the processing such as the information processing by the control unit 18 may be implemented by control information received from the external information processing device. For example, when the display processing explained above is performed by a predetermined application (for example, a remote meeting application), the control unit 18 may include, for example, an application control unit that controls a predetermined application or a dedicated application.

1-5. Procedure of Information Processing According to Embodiment

Subsequently, a procedure of the various kinds of information processing according to the embodiment is explained with reference to FIG. 9 to FIG. 12.

1-5-1. Procedure of Processing Relating to Information Processing Device

Figure 9:
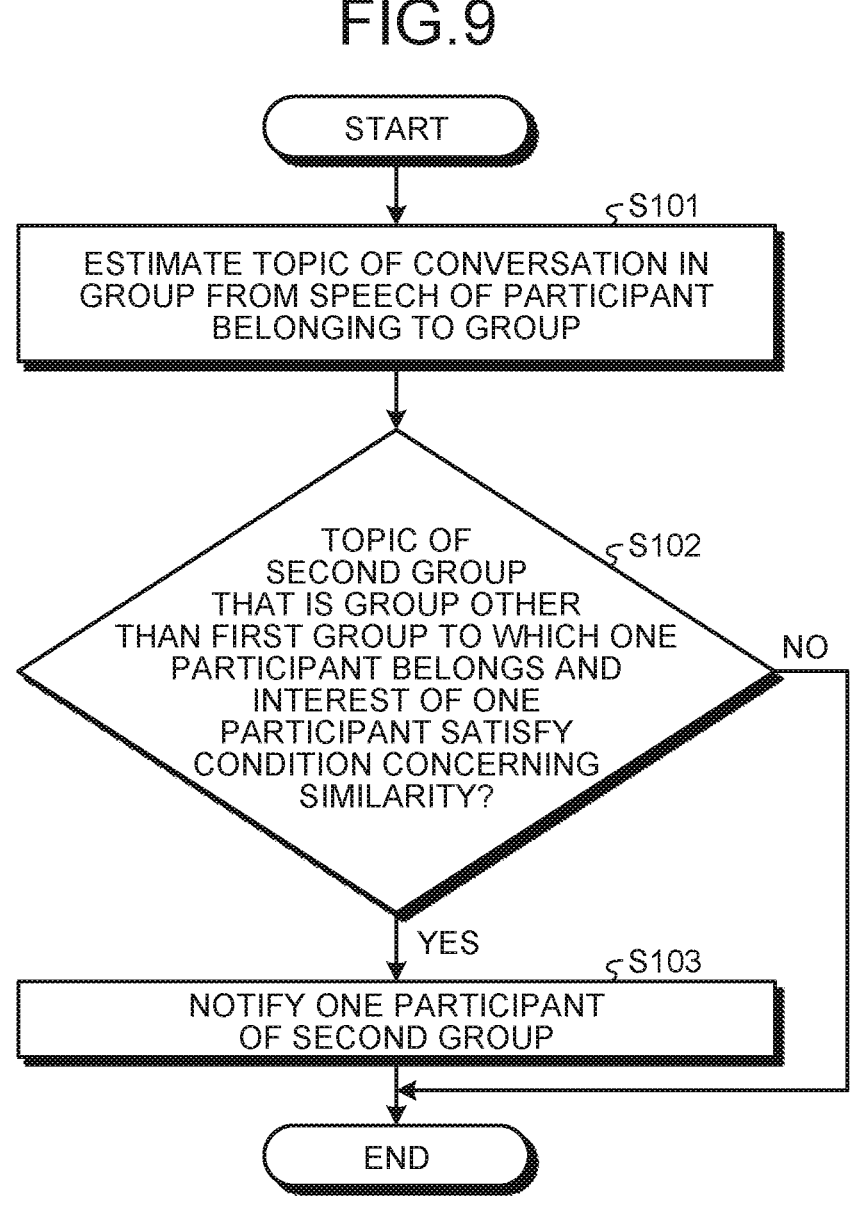
FIG. 9 is a flowchart illustrating a processing procedure of the information processing device according to the embodiment of the present disclosure.

First, a flow of processing relating to the information processing device is explained with reference to FIG. 9. FIG. 9 is a flowchart illustrating a processing procedure of the information processing device according to the embodiment of the present disclosure. Specifically, FIG. 9 is a flowchart illustrating a procedure of information processing by the remote meeting server 100, which is an example of the information processing device.

As illustrated in FIG. 9, the remote meeting server 100 estimates a topic of conversation in a group from speech of a participant belonging to the group (step S101). The remote meeting server 100 determines whether a topic of a second group, which is a group other than a first group to which one participant belongs, and an interest of the one participant satisfy a condition concerning similarity (step S102). When the topic of the second group and the interest of the one participant satisfy the condition concerning similarity (step S102: Yes), the remote meeting server 100 notifies the one participant of the second group (step S103).

On the other hand, when the topic of the second group and the interest of the one participant do not satisfy the condition concerning similarity (step S102: No), the remote meeting server 100 ends the processing without notifying the one participant of the second group. Note that, even when the topic of the second group and the interest of the one participant satisfy the condition concerning similarity, when the one participant is in a state of a person concerned in the first group to which the one participant belongs, the remote meeting server 100 may end the processing without notifying the one participant of the second group.

1-5-2. Procedure of Processing Relating to Terminal Device

Figure 10:
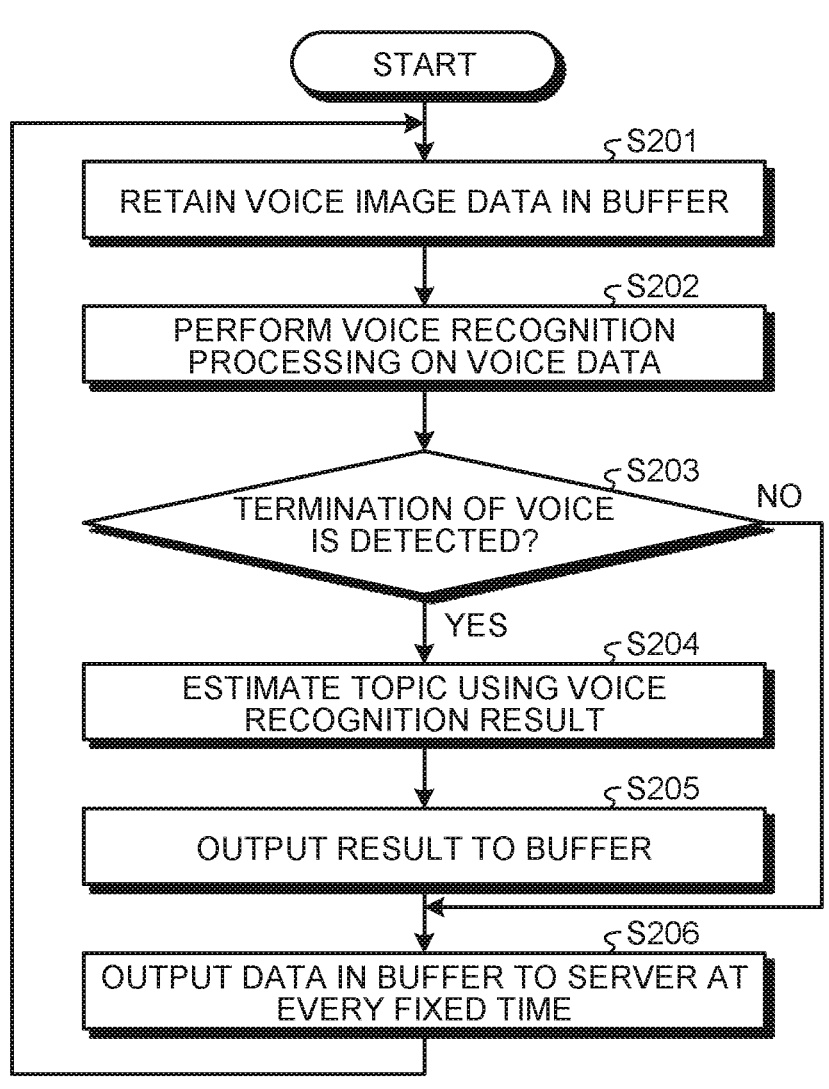
FIG. 10 is a flowchart illustrating a processing procedure in the terminal device according to the embodiment of the present disclosure.

Next, processing on the terminal device 10 side is explained with reference to FIG. 10. FIG. 10 is a flowchart illustrating a processing procedure in the terminal device according to the embodiment of the present disclosure. FIG. 10 is a flowchart illustrating an example of processing in the case in which the terminal device 10 provides a service concerning a remote meeting.

In FIG. 10, the terminal device 10 retains voice image data in a buffer (step S201). The terminal device 10 retains voice image data including voice data and image data of the user in a buffer.

The terminal device 10 executes voice recognition processing on the voice data (step S202). The terminal device 10 determines presence or absence of termination detection of voice (step S203). Note that the termination detection of the voice only has to be performed using various conventional techniques as appropriate. Detailed description of the termination detection of the voice is omitted.

When the end of the voice is detected (step S203: Yes), the terminal device 10 estimates the topic using the voice recognition result (step S204). For example, the terminal device 10 uses a voice recognition result to estimate a topic (preference) of utterance of the user based on content of the utterance of the user. For example, the terminal device 10 extracts a keyword from character information obtained by converting the utterance of the user into text and estimates that the extracted keyword is a topic of the utterance of the user, that is, preference of the user at that time.

The terminal device 10 outputs a result to the buffer (step S205). For example, the terminal device 10 adds information (preference information) indicating the estimated preference to the buffer.

The terminal device 10 outputs data in the buffer to the server at every fixed time (step S206). The terminal device 10 transmits the data retained in the buffer to the remote meeting server 100 at every fixed time. For example, when there is preference information in the buffer, the terminal device 10 transmits the voice image data and the preference information in the buffer to the remote meeting server 100.

On the other hand, when the termination of the voice is not detected (step S203: No), the terminal device 10 performs the processing in step S206 without estimating a topic of utterance of the user (preference of the user). For example, when there is no preference information in the buffer, the terminal device 10 transmits the voice image data in the buffer to the remote meeting server 100.

Note that the above is merely an example and the terminal device 10 may transmit information to the remote meeting server 100 at any timing if a service concerning a remote meeting can be provided.

1-5-3. Procedure of Processing Relating to Remote Meeting Server

Figure 11:
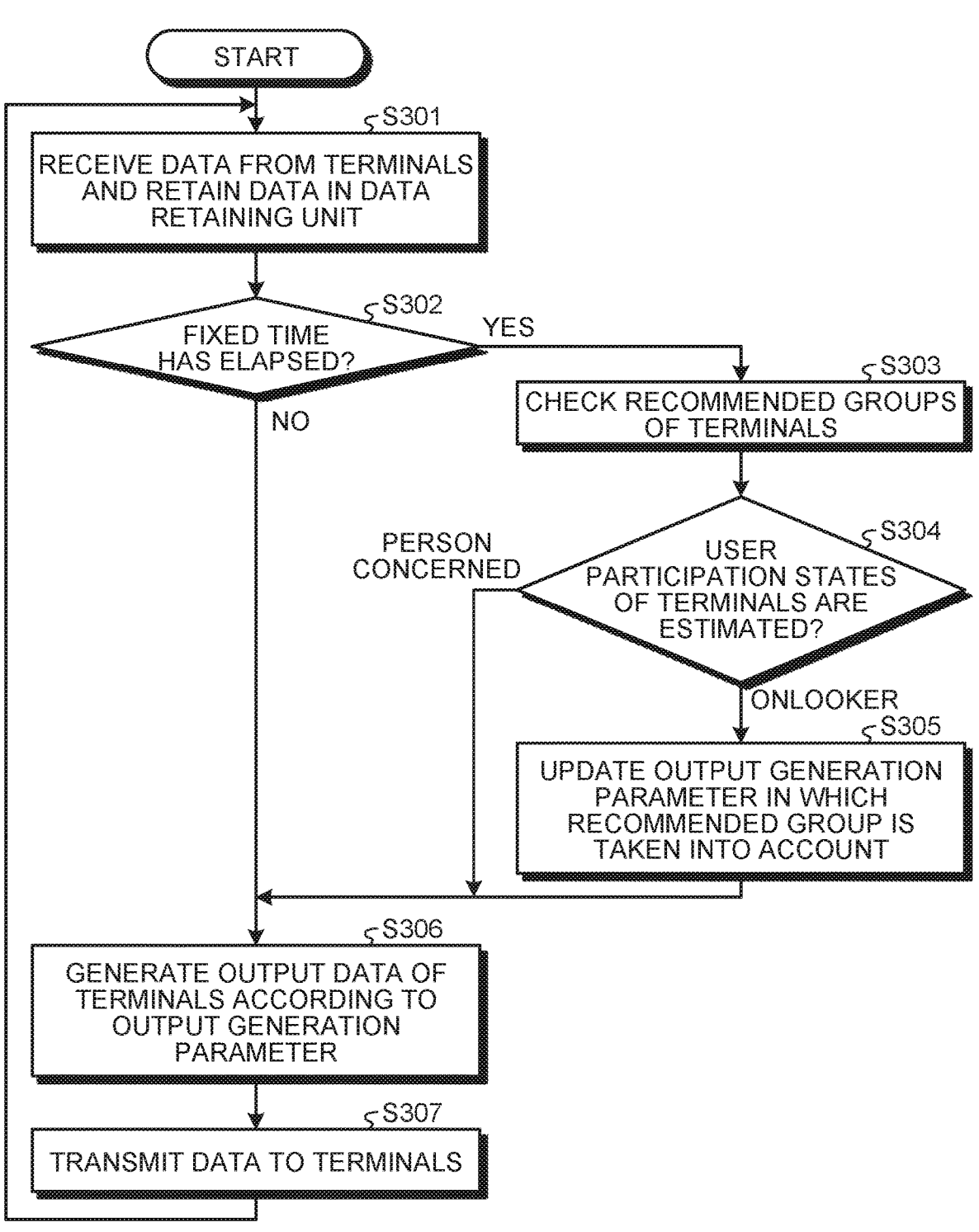
FIG. 11 is a flowchart illustrating a processing procedure of the remote meeting server according to the embodiment of the present disclosure.

Subsequently, processing on the remote meeting server 100 side is explained with reference to FIG. 11. FIG. 11 is a flowchart illustrating a processing procedure of the remote meeting server according to the embodiment of the present disclosure. FIG. 11 is a flowchart illustrating an example of processing in the case in which the remote meeting server 100 provides a service concerning a remote meeting.

In FIG. 11, the remote meeting server 100 receives data from the terminals and retains the data in the data retaining unit (step S301). For example, the remote meeting server 100 receives data from the terminal devices 10 and stores the received data in the storage unit 120 with the data retaining unit 132.

When a fixed time has elapsed (step S302: Yes), the remote meeting server 100 checks recommended groups of the terminals (step S303). For example, the remote meeting server 100 checks, at a predetermined interval (for example, several seconds or several ten seconds), a recommended group to the users who uses the terminal devices 10.

The remote meeting server 100 estimates user participation states of the terminals (step S304) and divides the processing according to an estimation result.

When having estimated that a participation state of the user is an onlooker (step S304: onlooker), the remote meeting server 100 updates an output generation parameter taking into account the recommended group (step S305). For example, the remote meeting server 100 updates an output generation parameter used to generate output data to be transmitted to the terminal device 10 of the user to content in which the recommended group to the user is taken into account. The remote meeting server 100 executes processing of step S306.

On the other hand, when having estimated that the participation state of the user is a person concerned (step S304: person concerned), the remote meeting server 100 executes the processing in step S306 without executing the processing in step S305. That is, when having estimated that the participation state of the user a person concerned, the remote meeting server 100 executes the processing in step S306.

The remote meeting server 100 generates output data of the terminals according to an output generation parameter (step S306). The remote meeting server 100 generates, according to presence or absence of a recommended group to a user, output data to be provided to the terminal device 10 of the user.

For example, when information concerning a recommended group is included in the output generation parameter, the remote meeting server 100 generates output data to be transmitted to the terminal device 10 of the user with content in which the recommended group to the user is taken into account. In this case, for example, as illustrated in FIG. 2, the remote meeting server 100 generates output data such that the recommended group to the user is displayed on the terminal device 10 of the user.

For example, when information concerning a recommended group is not included in the output generation parameter, the remote meeting server 100 generates output data to be transmitted to the terminal device 10 of the user with content in which a recommended group to the user is not taken into account. In this case, for example, as illustrated in FIG. 4, the remote meeting server 100 generates output data such that a recommended group to the user is not displayed on the terminal device 10 of the user.

When the certain period of time has not elapsed (step S302: No), the remote meeting server 100 executes the processing in step S306 without executing the processing in S303 to S305. In this case, for example, the remote meeting server 100 generates output data to be transmitted to the terminal device 10 of the user with content in which a recommended group to the user is not taken into account.

The remote meeting server 100 transmits data to the terminals (step S307). The remote meeting server 100 transmits, to the terminal devices 10 used by users, output data generated for the users.

1-5-4. Procedure of Matching Processing

Figure 12:
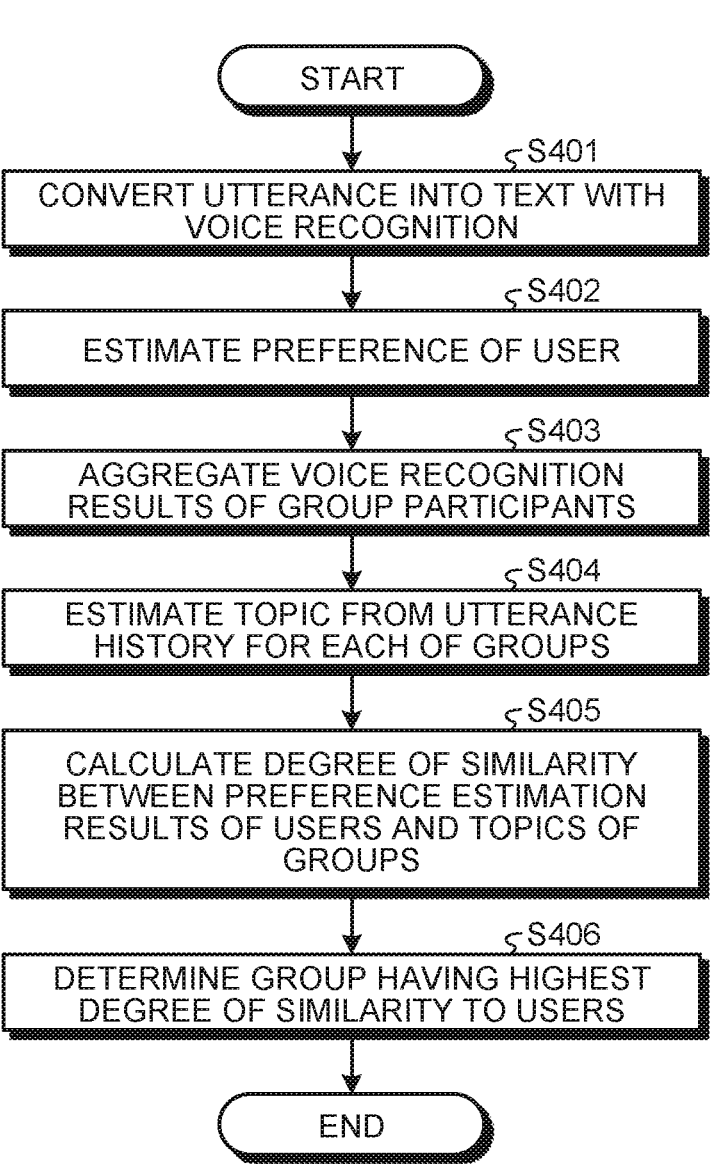
FIG. 12 is a flowchart illustrating a matching processing procedure.

Subsequently, matching processing in the remote meeting system 1 is explained with reference to FIG. 12. FIG. 12 is a flowchart illustrating a matching processing procedure. The matching process illustrated in FIG. 12 corresponds to, for example, steps S202 to S204 in FIG. 10 and steps S301 to S303 in FIG. 11. Note that, in the following explanation, a case in which the remote meeting system 1 performs the processing is explained as an example. However, the processing illustrated in FIG. 12 may be performed by any device such as the remote meeting server 100 or the terminal device 10 according to a device configuration included in the remote meeting system 1.

In FIG. 12, the remote meeting system 1 converts utterance into text with voice recognition (step S401). For example, the remote meeting system 1 converts utterance of a user into character information with voice recognition.

The remote meeting system 1 estimates preference of the user (step S402). For example, the remote meeting system 1 extracts a keyword from character information obtained by converting the utterance of the user into text and estimates that the extracted keyword is preference of the user.

The remote meeting system 1 aggregates voice recognition results of group participants (step S403). For example, the remote meeting system 1 collects character information obtained by converting utterance of a participant (a user) into a text for each of the groups.

The remote meeting system 1 estimates a topic from an utterance history for each of the groups (step S404). For example, the remote meeting system 1 extracts a keyword from character information of the utterance history for each of the groups and estimates that the extracted keyword is a topic of the group.

The remote meeting system 1 calculates degree of similarity between preference estimation results of the users and topics of the groups (step S405). For example, the remote meeting system 1 calculates degree of similarity between preference of the users and a topic of a group (a second group) other than a group (a first group) to which the users belong.

The remote meeting system 1 determines a group having the highest degree of similarity to the users (step S406). For example, the remote meeting system 1 determines a group (the second group) having the highest degree of similarity as a recommended group for the users.

1-6. Output Mode Example (Party Venue)

Figure 13:
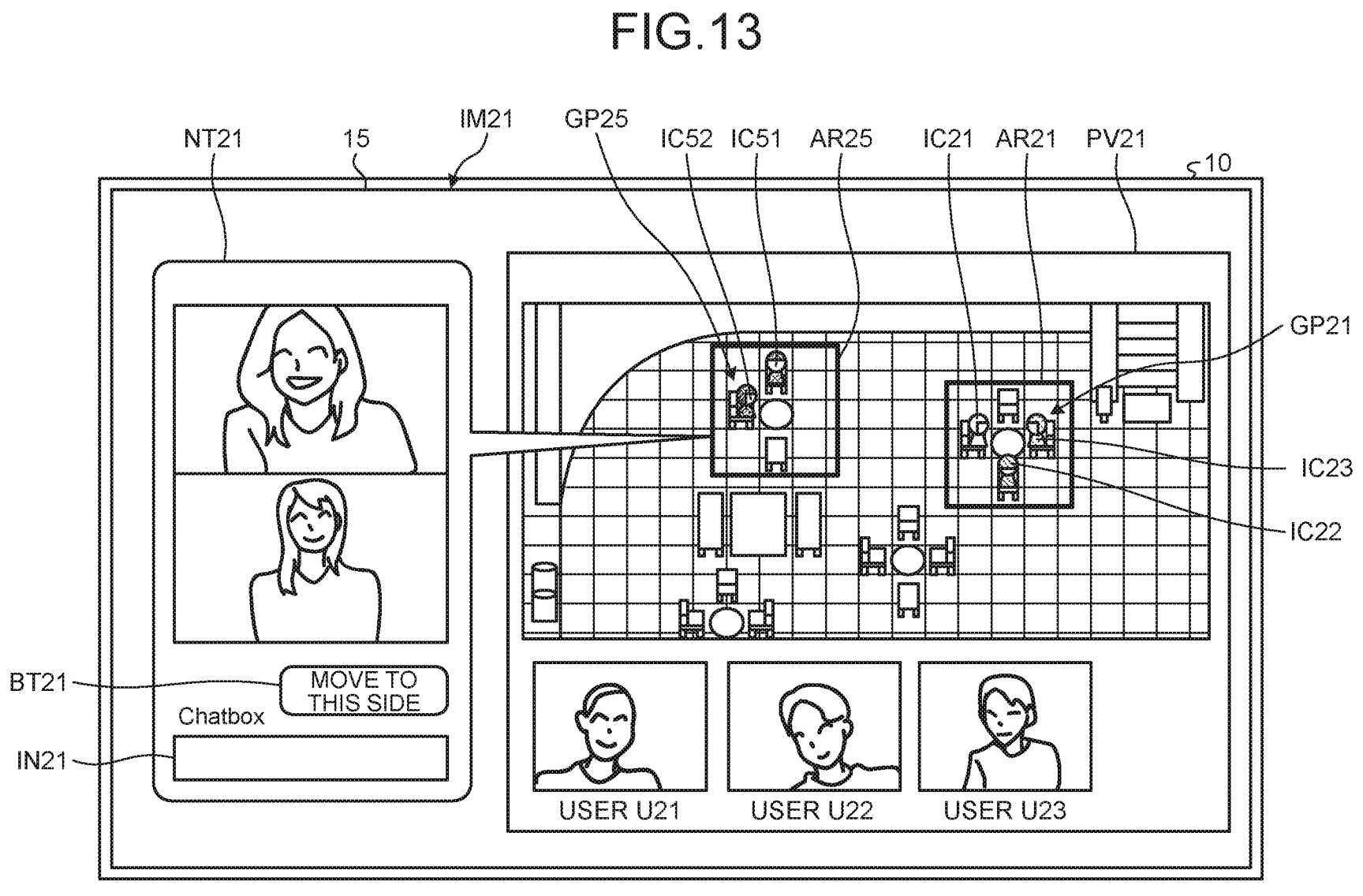

An output mode of a remote meeting such as notification of a recommended group is not limited to the examples illustrated in FIG. 2 to FIG. 4 and may be various output modes. For example, the output mode may be an output mode reflecting virtual positions of groups or users. Concerning this point, an example of an output mode of display and voice output is explained using display like a party venue illustrated in FIG. 13. Note that, in FIG. 13, an output mode of display or voice output is explained. Therefore, explanation about processing for determining a recommended group such as matching processing serving as a premise of the explanation is omitted. In FIG. 13, explanation is omitted as appropriate about the same points as the points in FIG. 2 to FIG. 4. FIG. 13 is a diagram illustrating an example of a display mode.

FIG. 13 illustrates, as an example, display on the terminal device 10 of the user U22, who is an onlooker in the group GP21. On the display 15 of the terminal device 10 illustrated in FIG. 13, a screen IM21 including a virtual party site PV21 reflecting virtual positions of groups and users and a notification area NT21 notifying the user U22 of a recommended group is displayed.

For example, in the terminal device 10 of the user U22, icons IC21 to IC23 corresponding to the users U21 to U23 of the group GP21 are arranged in the virtual party site PV21. Specifically, the icon IC22 corresponding to the user U22 is arranged on the lower side of a table in an area AR21 in which the group GP21 is arranged. The icon IC21 corresponding to the user U21 is arranged in the left oblique front of the icon IC22 and the icon IC23 corresponding to the user U23 is arranged in the right oblique front of the icon IC22.

In the virtual party site PV21, a group GP25, which is a recommended group (a second group) to the user U22, is arranged in a table in an area AR25 located on the left side of the area AR21 where the group GP21 is arranged. Specifically, icons IC51 and IC52 corresponding to two users belonging to the group GP25 are arranged in a table on the left side of the table in which the group GP21 is arranged.

In the notification area NT21 in the screen IM21, information concerning the group GP25, which is the recommended group to the user U22, is arranged. The information of the group GP25 displayed in the notification area NT21 includes images of users participating in the group GP25. A movement button BT21 for moving to the group GP25 is arranged under the information concerning the group GP25 in the notification area NT21. For example, when the user U22 selects the movement button BT21, the group to which the user U22 belongs is changed from the group GP21 to the group GP25. Under the movement button BT21 in the notification area NT21, a chat box IN21 for transmitting character information to the user of the group GP25 is arranged.

Voice output in the terminal device 10 illustrated in FIG. 13 is explained. The terminal device 10 illustrated in FIG. 13 superimposes voice of the group GP25, which is the recommended group (the second group) to the user U22, on voice of the group GP21, which is the first group of the user U22, and outputs the voice.

The terminal device 10 outputs voice of a participant in the second group from a direction corresponding to a relation between display positions of the first group and the second group. Since the group GP25 is located on the left side with respect to the user U22 of the group GP21, the terminal device 10 illustrated in FIG. 13 outputs the voice of the group GP25 from the left side. For example, the terminal device 10 adjusts sound volume of the voice of the group GP25 so that output sound volume in the left direction is larger than output sound volume in the right direction and outputs the voice of the group GP25. In this case, the remote meeting server 100 sets a parameter for the voice of the group GP25 such that the output sound volume in the left direction is larger than the output sound volume in the right direction and notifies the terminal device 10a of the parameter.

For example, by adjusting and outputting sound volume in the left-right direction with a stereo function of the terminal device 10, the terminal device 10 may perform notification in a mode in which voice of a participant in the second group is output from a direction corresponding to the relation between the display positions of the first group and the second group. For example, when the terminal device 10 includes speakers respectively on the left and the right, the terminal device 10 may cause only the left speaker to output the voice of the group GP25. Note that the above is merely an example and, when performing notification of voice and an image of the participant in the second group, the remote meeting system 1 may perform the notification in any notification mode if notification of a correspondence relation between the voice and the image of the participant in the second group can be performed in a recognizable mode. For example, the notification mode may be an expression on a virtual space such as a game using VR (Virtual Reality) goggles or the like. In this case, for example, the terminal device 10 may be VR goggles and the terminal device 10 may display a virtual space like a game and output voice in a positional relation corresponding to the displayed virtual space.

When the user U21 is a person concerned in the group GP21, in the terminal device 10 of the user U21, a screen not including information concerning a recommended group to the user U21 and the notification area NT21 is displayed. For example, on the terminal device 10 of the user U21, the virtual party site PV21 in which only the icons IC21 to IC23 corresponding to the users U21 to U23 of the group GP21 are arranged may be displayed.

2. Other Embodiments

The processing according to the embodiments explained above may be performed in various different forms (modifications) other than the embodiments and the modifications explained above.

2-1. Other Configuration Examples

In the remote meeting system 1 in the example explained above, the terminal device 10 performs the voice recognition and the preference estimation and the remote meeting server 100 performs the topic estimation and the matching processing for a group. However, any mode can be adopted for division of functions in the remote meeting system 1.

For example, in the remote meeting system 1, the remote meeting server 100 may perform the voice recognition and the preference estimation for the users. In the example explained above, the terminal devices 10 include the voice recognition units 182 and the preference estimation units 183. However, these may be collectively implemented by a server. In this case, the remote meeting server 100 owns information stored in the storage unit 17 and has the functions of the voice recognition unit 182 and the preference estimation unit 183. The terminal device 10 functions as a device that transmits information such as utterance and an image of a user to the remote meeting server 100 and outputs information received from the remote meeting server 100, that is, a so-called thin client. As explained above, the remote meeting system 1 may have a configuration of a so-called centralized system like a client-server system in which main processing is executed on a server side.

For example, in the remote meeting system 1, the terminal device 10 may perform the topic estimation and the matching processing for a group. In this case, the terminal device 10 functions as an information processing device that performs notification of a recommended group. For example, the terminal device 10 owns information stored in the storage unit 120 and has the functions of the data retaining unit 132, the group management unit 133, the topic matching unit 134, the output generation unit 135, and the notification unit 136. For example, the voice output unit 13, the display 15, the processing unit 184, and the like of the terminal device 10 function as the notification unit 136. For example, the terminal device 10 functions as a rich client that performs the voice recognition, the preference estimation for a user, the topic estimation for a group, and the matching processing. The remote meeting server 100 collects information from the terminal devices 10 and provides necessary information to the terminal device 10.

For example, when the terminal devices 10 perform communication or sharing of information for providing a service concerning a remote meeting among the terminal devices 10 according to a mode such as a so-called peer to peer (P2P), the remote meeting system 1 may not include the remote meeting server. As explained above, the remote meeting system 1 may execute main processing, for example, on the terminal (client) side of the user and the server may manage only information concerning the remote meeting or may have a system configuration not including the server, that is, a configuration of a so-called autonomous distributed system. As explained above, the remote meeting system 1 may have any configuration such as a centralized configuration or an autonomous distributed configuration.

Note that the configuration explained above is an example and the remote meeting system 1 may have any function division mode and any device configuration if the remote meeting system 1 can provide the service related to the remote meeting explained above.

2-2. Others

Among the kinds of processing explained in the embodiments explained above, all or a part of the processing explained as being automatically performed can be manually performed or all or a part of the processing explained as being manually performed can be automatically performed by a publicly-known method. Besides, the processing procedure, the specific names, and the information including the various data and parameters explained in the document and illustrated in the drawings can be optionally changed except when specifically noted otherwise. For example, the various kinds of information illustrated in the figures are not limited to the illustrated information.

The illustrated components of the devices are functionally conceptual and are not always required to be physically configured as illustrated in the figures. That is, specific forms of distribution and integration of the devices are not limited to the illustrated forms and all or a part thereof can be configured by being functionally or physically distributed and integrated in any unit according to various loads, usage situations, and the like.

The embodiments and the modifications explained above can be combined as appropriate in a range in which the processing contents are not contradictory.

The effects described in the present specification are merely illustrations and are not limited and other effects may be present.

3. Effects According to Present Disclosure

As explained above, the information processing device (for example, in the embodiment, the remote meeting server 100 or the terminal device 10) according to the present disclosure includes the estimation unit (the group management unit 133 in the embodiment) and the notification unit (the notification unit 136 in the embodiment). When a plurality of participants participating in a remote meeting are divided into a plurality of groups and can have conversation in the groups, the estimation unit estimates a topic of conversation in a group from speech of a participant belonging to the group. When a topic of a second group, which is a group other than a first group to which one participant belongs, and preference of the one participant satisfy a condition concerning similarity, the notification unit notifies the one participant of the second group.

As explained above, by notifying the one participant of a group other than a group to which the one participant belongs according to similarity between topics of groups and the preference of the one participant (user), the information processing device according to the present disclosure can notify a participant participating in a remote meeting of appropriate information.

The estimation unit estimates a participation state of the one participant in the first group. The notification unit changes notification handling concerning the second group according to the participation state of the one participant in the first group estimated by the estimation unit. As explained above, by changing the notification handling according to the participation state of the one participant, the information processing device can notify the participant participating in the remote meeting of appropriate information.

Furthermore, the estimation unit estimates whether a state of the one participant is a first state that is a state of actively participating or a second state that is a state other than the first state. The notification unit changes a notification mode of the second group to the one participant according to whether the one participant is in the first state or the second state. As explained above, by changing the notification handling according to whether the participation state of the one participant is the first state that is the state of actively participating or the second state other than the first state, the information processing device can notify the participant participating in the remote meeting of appropriate information.

The notification unit changes the notification timing of the second group to the one participant according to whether the one participant is in the first state or the second state. As explained above, by changing the notification timing according to whether the participation state of the one participant is the first state that is the state of actively participating or the second state other than the first state, the information processing device can notify the participant participating in the remote meeting at an appropriate timing.

The notification unit changes a display mode of the second group to the one participant according to whether the one participant is in the first state or the second state. As explained above, by changing the display mode of the second group according to whether the participation state of the one participant is the first state that is the state of actively participating or the second state other than the first state, the information processing device can notify the participant participating in the remote meeting of appropriate information.

When the one participant is in the second state, the notification unit notifies the one participant of the second group. As explained above, when the one participant is in the second state, by performing notification of the second group, the information processing device can perform notification when the one participant is in a state of not actively participating in the first group. Therefore, the information processing device can notify the participant participating in the remote meeting of appropriate information.

The notification unit notifies the one participant of the second group at a timing when the participation state of the one participant transitions from the first state to the second state. As explained above, by performing notification of the second group at the timing when the one participant transitions from the first state to the second state, the information processing device can perform notification at timing when the one participant comes into a state of not actively participating in the first group. Therefore, the information processing device can notify, at appropriate timing, the participant participating in the remote meeting.

The notification unit superimposes voice of a participant in the second group on voice of a participant in the first group. As explained above, by outputting voice of the second group together with voice of the first group in which the one participant is participating, the information processing device can cause the one participant to recognize both conversations. Therefore, the information processing device can notify, at appropriate timing, the participant participating in the remote meeting.

The notification unit superimposes the voice of the participant in the second group with second sound volume smaller than first sound volume of the first group. As explained above, by outputting the voice of the second group with sound volume smaller than the sound volume of the voice of the first group in which the one participant is participating, the information processing device can cause the one participant to recognize voice of the other groups while causing the one participant to concentrate on conversation of a group in which one participant is participating. Therefore, the information processing device can notify, at appropriate timing, the participant participating in the remote meeting.

The notification unit displays an image of the participant in the second group together with an image of the participant in the first group. As explained above, by displaying the image of the participant in the second group together with the image of the participant in the first group in which the one participant is participating, the information processing device can cause the one participant to recognize both the participants.

The notification unit identifiably displays the first group and the second group. As explained above, by identifiably displaying the first group and the second group, the information processing device can cause the one participant to identifiably recognize a group to which the one participant belongs and the other groups.

The notification unit displays the image of the participant in the second group in a second area smaller than a first area where the image of the participant in the first group is displayed. As explained above, by displaying the first group in which the one participant is participating larger than the second group, the information processing device can cause the one participant to recognize the other groups while causing the one participant to concentrate on the group in which one participant is participating.

When performing notification of voice and an image of the participant in the second group, the notification unit performs notification of a correspondence relation between the voice and the image of the participant in the second group in a recognizable mode. As explained above, by performing notification of the correspondence relation between the voice and the image of the participant in the second group in the recognizable mode, the information processing device can cause the one participant to appropriately recognize the second group. Therefore, the information processing device can notify, at appropriate timing, the participant participating in the remote meeting.

The notification unit performs notification in a mode in which the voice of the participant in the second group is output from a direction corresponding to a relation between display positions of the first group and the second group. As explained above, by performing notification in the mode in which the voice of the participant in the second group is output from the direction corresponding to the relation between the display positions of the first group and the second group, the information processing device can cause the one participant to appropriately recognize the second group. Therefore, the information processing device can notify, at appropriate timing, the participant participating in the remote meeting.

The notification unit notifies the one participant of the second group when a group keyword, which is a keyword indicating a topic of the second group, and a participant keyword, which is a keyword indicating preference of one participant, satisfy a condition concerning similarity. As explained above, by notifying the one participant of a group other than a group to which the one participant belongs according to similarity between topics of the groups and preference of the one participant (user) using the keywords, the information processing device can notify the participant participating in the remote meeting of appropriate information.

When a comparison result of the group keyword of the second group and the participant keyword of the one participant satisfies the condition concerning similarity, the notification unit notifies the one participant of the second group. As explained above, when the comparison result of the keywords satisfies the condition concerning similarity, by notifying the one participant of a group other than the group to which the one participant belongs, the information processing device can notify the participant participating in the remote meeting of appropriate information.

When the degree of similarity between the group keyword of the second group and the participant keyword of the one participant satisfies the condition concerning similarity, the notification unit notifies one participant of the second group. For example, when the similarity of the keywords is equal to or larger than a predetermined threshold, by notifying the one participant of a group other than the group to which the one participant belongs, the information processing device can notify the participant participating in the remote meeting of appropriate information.

4. Hardware Configuration

Figure 14:
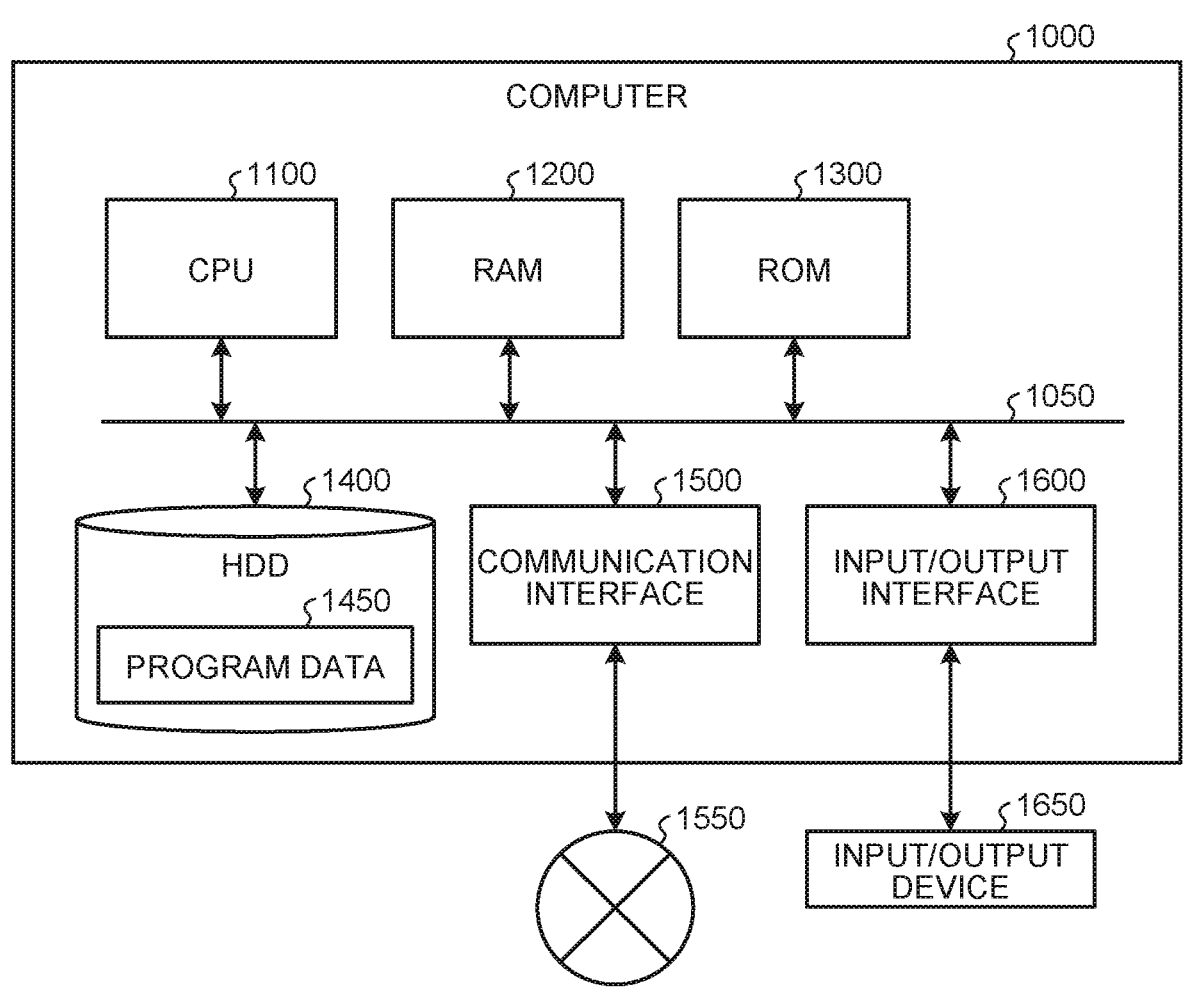
FIG. 14 is a hardware configuration diagram illustrating an example of a computer that implements functions of the information processing device.

The information processing devices (information equipment) such as the remote meeting server 100 and the terminal device 10 according to the embodiments explained above are implemented by, for example, a computer 1000 having a configuration illustrated in FIG. 14. FIG. 14 is a hardware configuration diagram illustrating an example of the computer 1000 that realizes the functions of the information processing device. In the following explanation, the remote meeting server 100 according to the embodiment is explained as an example. The computer 1000 includes a CPU 1100, a RAM 1200, a ROM (Read Only Memory) 1300, an HDD (Hard Disk Drive) 1400, a communication interface 1500, and an input/output interface 1600. The units of the computer 1000 are connected by a bus 1050.

The CPU 1100 operates based on programs stored in the ROM 1300 or the HDD 1400 and controls the units. For example, the CPU 1100 develops the programs stored in the ROM 1300 or the HDD 1400 in the RAM 1200 and executes processing corresponding to various programs.

The ROM 1300 stores a boot program such as a BIOS (Basic Input Output System) executed by the CPU 1100 at a start time of the computer 1000, a program depending on hardware of the computer 1000, and the like.

The HDD 1400 is a computer-readable recording medium that non-transiently records a program to be executed by the CPU 1100, data to be used by such a program, and the like. Specifically, the HDD 1400 is a recording medium that records an information processing program according to the present disclosure, which is an example of program data 1450.

The communication interface 1500 is an interface for the computer 1000 to be connected to an external network 1550 (for example, the Internet). For example, the CPU 1100 receives data from other equipment and transmits data generated by the CPU 1100 to the other equipment via the communication interface 1500.

The input/output interface 1600 is an interface for connecting an input/output device 1650 and the computer 1000. For example, the CPU 1100 receives data from an input device such as a keyboard or a mouse via the input/output interface 1600. The CPU 1100 transmits data to an output device such as a display, a speaker, or a printer via the input/output interface 1600. The input/output interface 1600 may function as a media interface that reads a program or the like recorded in a predetermined recording medium (a medium). The medium is, for example, an optical recording medium such as a DVD (Digital Versatile Disc) or a PD (Phase change rewritable Disk), a magneto-optical recording medium such as an MO (Magneto-Optical disk), a tape medium, a magnetic recording medium, or a semiconductor memory.

For example, when the computer 1000 functions as the remote meeting server 100 according to the embodiment, the CPU 1100 of the computer 1000 realizes the functions of the control unit 130 and the like by executing the information processing program loaded on the RAM 1200. The HDD 1400 stores the information processing program according to the present disclosure and the data in the storage unit 120. Note that the CPU 1100 reads the program data 1450 from the HDD 1400 and executes the program data. However, as another example, the CPU 1100 may acquire these programs from another device via the external network 1550.

Note that the present technique can also take the following configurations.

(1)

An information processing device comprising:

an estimation unit that, when a plurality of participants participating in a remote meeting are divided into a plurality of groups and can have conversation in the groups, estimates a topic of conversation in a group from speech of a participant belonging to the group; and a notification unit that, when the topic of a second group that is a group other than a first group that is a group to which one participant belongs and preference of the one participant satisfy a condition concerning similarity, notifies the one participant of the second group.

(2)

The information processing device according to (1), wherein the estimation unit estimates a participation state of the one participant in the first group, and the notification unit changes notification handling concerning the second group according to the participation state of the one participant in the first group estimated by the estimation unit.

(3)

The information processing device according to (2), wherein the estimation unit estimates whether a state of the one participant is a first state that is a state of actively participating or a second state that is a state other than the first state, and the notification unit changes a notification mode of the second group to the one participant according to whether the one participant is in the first state or the second state.

(4)

The information processing device according to (3), wherein the notification unit changes notification timing of the second group to the one participant according to whether the one participant is in the first state or the second state.

(5)

The information processing device according to (3) or (4), wherein the notification unit changes a display mode of the second group to the one participant according to whether the one participant is in the first state or the second state.

(6)

The information processing device according to any one of (3) to (5), wherein the notification unit notifies the one participant of the second group when the one participant is in the second state.

(7)

The information processing device according to any one of (3) to (6), wherein the notification unit notifies the one participant of the second group at timing when the participation state of the one participant transitions from the first state to the second state.

(8)

The information processing device according to any one of (1) to (7), wherein the notification unit superimposes voice of a participant in the second group on voice of a participant in the first group.

(9)

The information processing device according to (8), wherein the notification unit superimposes the voice of the participant in the second group with second sound volume smaller than first sound volume of the first group.

(10)

The information processing device according to any one of (1) to (9), wherein the notification unit displays an image of a participant in the second group together with an image of a participant in the first group.

(11)

The information processing device according to (10), wherein the notification unit identifiably displays the first group and the second group.

(12)

The information processing device according to (10) or (11), wherein the notification unit displays the image of the participant in the second group in a second area smaller than a first area where the image of the participant of the first group is displayed.

(13)

The information processing device according to any one of (1) to (12), wherein, when performing notification of voice and an image of a participant in the second group, the notification unit performs notification of a correspondence relation between voice and an image of the participant in the second group in a recognizable mode.

(14)

The information processing device according to (13), wherein the notification unit performs notification in a mode in which voice of a participant in the second group is output from a direction corresponding to a relation between display positions of the first group and the second group.

(15)

The information processing device according to any one of (1) to (14), wherein the notification unit notifies the one participant of the second group when a group keyword, which is a keyword indicating the topic of the second group, and a participant keyword, which is a keyword indicating preference of the one participant, satisfy the condition concerning similarity.

(16)

The information processing device according to (15), wherein the notification unit notifies the one participant of the second group when a comparison result between the group keyword of the second group and the participant keyword of the one participant satisfies the condition concerning similarity.

(17)

The information processing device according to (15) or (16), wherein the notification unit notifies the one participant of the second group when degree of similarity between the group keyword of the second group and the participant keyword of the one participant satisfies the condition concerning similarity.

(18)

An information processing method for determining processing comprising:

when a plurality of participants participating in a remote meeting are divided into a plurality of groups and can have conversation in the groups, estimating a topic of conversation in a group from speech of a participant belonging to the group; and when the topic of a second group that is a group other than a first group that is a group to which one participant belongs and preference of the one participant satisfy a condition concerning similarity, notifying the one participant of the second group.

REFERENCE SIGNS LIST

1 REMOTE MEETING SYSTEM
100 REMOTE MEETING SERVER (INFORMATION PROCESSING DEVICE)

110 COMMUNICATION UNIT
120 STORAGE UNIT
121 USER INFORMATION STORAGE UNIT
122 GROUP INFORMATION STORAGE UNIT
130 CONTROL UNIT
131 ACQUISITION UNIT
132 DATA RETAINING UNIT
133 GROUP MANAGEMENT UNIT
134 TOPIC MATCHING UNIT
135 OUTPUT GENERATION UNIT
136 NOTIFICATION UNIT
10 TERMINAL DEVICE (INFORMATION PROCESS-
ING DEVICE)
11 COMMUNICATION UNIT
12 VOICE INPUT UNIT
13 VOICE OUTPUT UNIT
14 CAMERA
15 DISPLAY (NOTIFICATION UNIT)
16 OPERATION UNIT
17 STORAGE UNIT
18 CONTROL UNIT
181 ACQUISITION UNIT
182 VOICE RECOGNITION UNIT
183 PREFERENCE ESTIMATION UNIT
184 PROCESSING UNIT

The invention claimed is:

1. An information processing device, comprising:
a group information storage unit configured to store
information of a plurality of participants in a remote
meeting, wherein
the plurality of participants is in a plurality of groups,
and
each of the plurality of groups is associated with a
respective conversation;
an estimation unit configured to:
determine a topic of conversation in a first group of the
plurality of groups based on a voice recognition
result of a participant of the first group, wherein
the stored information includes a plurality of voice
recognition results, and
the plurality of voice recognition results includes the
voice recognition result of the participant of the
first group; and
determine a participation state of the participant of the
first group;
a topic matching unit configured to determine that a topic
of conversation of a second group of the plurality of
groups and preference information of the participant of
the first group satisfy a condition that is associated with
a similarity between a plurality of keywords, wherein
the plurality of keywords is associated with each of the
topic of conversation of the second group and the
preference information, and
the first group is different from the second group; and
a notification unit configured to:
transmit a first notification to a participant of the second
group based on the determination that the topic of
conversation of the second group and the preference
information of the participant of the first group
satisfy the condition that is associated with the
similarity between the plurality of keywords,
wherein the plurality of participants includes each of
the participant of the first group and the participant
of the second group; and
change notification handling of the second group based
on the participation state of the participant of the first
group.

2. The information processing device according to claim
1, wherein
the estimation unit is further configured to determine that
the participation state of the participant of the first
group is one of a first state or a second state,
the first state is an active participation state,
the second state is an onlooker state, and
the notification unit is further configured to change a
notification mode of the second group based on the
determination that the participant of the first group is in
the one of the first state or the second state.

3. The information processing device according to claim
2, wherein the notification unit is further configured to
change a notification timing of the second group based on
the determination that the participant of the first group is in
the one of the first state or the second state.

4. The information processing device according to claim
2, wherein the notification unit is further configured to
change a display mode of the second group based on the
determination that the participant of the first group is in the
one of the first state or the second state.

5. The information processing device according to claim
2, wherein the notification unit is further configured to
transmit a second notification to the participant of the second
group based on the participant of the first group is in the
second state.

6. The information processing device according to claim
2, wherein the notification unit is further configured to
transmit a second notification to the participant of the second
group at a time of transition of the participation state of the
participant of the first group from the first state to the second
state.

7. The information processing device according to claim
1, wherein the notification unit is further configured to
superimpose voice of the participant of the second group on
voice of the participant of the first group.

8. The information processing device according to claim
7, wherein
the notification unit is further configured to superimpose
the voice of the participant of the second group with a
specific sound,
the specific sound is associated with the second group,
and
a volume of the specific sound is less than a volume of a
sound of the first group.

9. The information processing device according to claim
1, wherein the notification unit is further configured to
display an image of the participant of the second group with
an image of the participant of the first group.

10. The information processing device according to claim
9, wherein the notification unit is further configured to
display each of the first group and the second group.

11. The information processing device according to claim
9, wherein
the notification unit is further configured to:
display, in a first area, the image of the participant of
the first group; and
display, in a second area, the image of the participant of
the second group, and
the second area is less than the first area.

12. The information processing device according to claim
1, wherein
the notification unit is further configured to:
transmit a second notification to a terminal device of
the participant of the second group, wherein the
second notification includes each of a voice of the participant of the second group and an image of the participant of the second group; and transmit, at a time of the transmission of the second notification, a third notification in a recognizable mode, and the third notification is a correspondence relation between the voice the participant of the second group and the image of the participant of the second group.

13. The information processing device according to claim 12, wherein the notification unit is further configured to transmit the second notification in a specific mode such that the voice of the participant of the second group is output from a specific direction, and the specific direction corresponds to a relation between a display position of the first group and a display position of the second group.

14. The information processing device according to claim 1, wherein the notification unit is further configured to transmit the first notification to the participant of the second group based on a group keyword and a participant keyword satisfy the condition associated with the similarity between the plurality of keywords, the plurality of keywords includes the group keyword and the participant keyword, the group keyword indicates the topic of the second group, and the participant keyword indicates the preference information of the participant of the first group.

15. The information processing device according to claim 14, wherein the notification unit is further configured to transmit the first notification to the participant of the second group based on a comparison result that satisfies the condition that is associated with the similarity between the plurality of keywords, and the comparison result corresponds to a comparison between the group keyword and the participant keyword.

16. The information processing device according to claim 14, wherein the notification unit is further configured to transmit the first notification to the participant of the second group based on a degree of similarity is greater than or equal to a threshold value, and the degree of similarity is between the group keyword and the participant keyword.

17. An information processing method, comprising:

in an information processing device:

storing information of a plurality of participants in a remote meeting, wherein the plurality of participants is in a plurality of groups, and each of the plurality of groups is associated with a respective conversation;

determining a topic of conversation in a first group of the plurality of groups based on a voice recognition result of a participant of the first group, wherein the stored information includes a plurality of voice recognition results, and the plurality of voice recognition results includes the voice recognition results of the participant of the first group;

determining a participation state of the participant of the first group;

determining that a topic of conversation of a second group of the plurality of groups and preference information of the participant of the first group satisfy a condition that is associated with a similarity between a plurality of keywords, wherein the plurality of keywords is associated with each of the topic of conversation of the second group and the preference information, and the first group is different from the second group;

transmitting a notification to a participant of the second group based on the determination the topic of conversation of the second group and preference information of the participant of the first group satisfy a condition that is associated with the similarity between the plurality of keywords, wherein the plurality of participants includes each of the participant of the first group and the participant of the second group; and changing notification handling of the second group based on the participation state of the participant of the first group.

* * * * *